US009197347B2

(12) United States Patent
Nakashima et al.

(10) Patent No.: US 9,197,347 B2
(45) Date of Patent: Nov. 24, 2015

(54) OPTICAL TRANSMISSION SYSTEM AND NOISE SUPPRESSION METHOD

(75) Inventors: Mineshi Nakashima, Kawasaki (JP); Yasuko Nozu, Kawasaki (JP); Katsuhiro Shirai, Kawasaki (JP); Koji Takeguchi, Kawasaki (JP); Toshihiro Togo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 13/612,745

(22) Filed: Sep. 12, 2012

(65) Prior Publication Data
US 2013/0071104 A1 Mar. 21, 2013

(30) Foreign Application Priority Data

Sep. 20, 2011 (JP) ................................ 2011-205315

(51) Int. Cl.
 *H04J 14/02* (2006.01)
(52) U.S. Cl.
 CPC ......... *H04J 14/0204* (2013.01); *H04J 14/0212* (2013.01); *H04J 14/0267* (2013.01); *H04J 14/0275* (2013.01); *H04J 14/0283* (2013.01); *H04J 14/0294* (2013.01); *H04J 14/0217* (2013.01); *H04J 14/0269* (2013.01)
(58) Field of Classification Search
 USPC ......... 398/17, 18, 22, 25, 1–8, 11, 15, 30–34, 398/37, 58, 59, 83–85
 See application file for complete search history.

(56) References Cited

U.S. PATENT DOCUMENTS

| 5,420,877 | A | * | 5/1995 | Sandstrom | 372/34 |
|---|---|---|---|---|---|
| 6,194,707 | B1 | * | 2/2001 | Yang | 250/227.15 |
| 6,718,141 | B1 | * | 4/2004 | deVette | 398/82 |
| 7,113,698 | B1 | * | 9/2006 | Ryhorchuk et al. | 398/10 |
| 7,286,758 | B2 | | 10/2007 | Shimada et al. | |
| 2002/0101633 | A1 | * | 8/2002 | Onaka et al. | 359/119 |
| 2006/0188253 | A1 | * | 8/2006 | Shimada et al. | 398/31 |
| 2008/0253764 | A1 | * | 10/2008 | Collings et al. | 398/37 |
| 2009/0129770 | A1 | | 5/2009 | Oohashi et al. | |
| 2010/0061722 | A1 | * | 3/2010 | Hashiguchi et al. | 398/26 |
| 2010/0142940 | A1 | | 6/2010 | Izumi | |
| 2011/0116789 | A1 | * | 5/2011 | Wellbrock et al. | 398/5 |

FOREIGN PATENT DOCUMENTS

| JP | 2008-252657 | A | 10/2008 |
|---|---|---|---|
| JP | 2009-130505 | A | 6/2009 |
| WO | WO-2005/008924 | A1 | 1/2005 |
| WO | WO-2009/022406 | A1 | 2/2009 |

* cited by examiner

*Primary Examiner* — David Payne
*Assistant Examiner* — Casey Kretzer
(74) *Attorney, Agent, or Firm* — Fujitsu Patent Center

(57) ABSTRACT

A noise suppression method is used in an optical transmission system which includes node equipments transmitting a WDM optical signal. First node equipment drops a first optical signal from the WDM optical signal. The method includes: transmitting a failure signal that specifies the first optical signal from second node equipment to the first node equipment via a first route when the second node equipment arranged on the first route for transmitting the first optical signal to the first node equipment has detected a failure of the first optical signal; transmitting a shutoff signal that specifies the first optical signal from the first node equipment toward the second node equipment via the first route; and shutting off an optical output of a wavelength corresponding to the first optical signal in third node equipment that has relayed the failure signal and has received the shutoff signal.

6 Claims, 31 Drawing Sheets

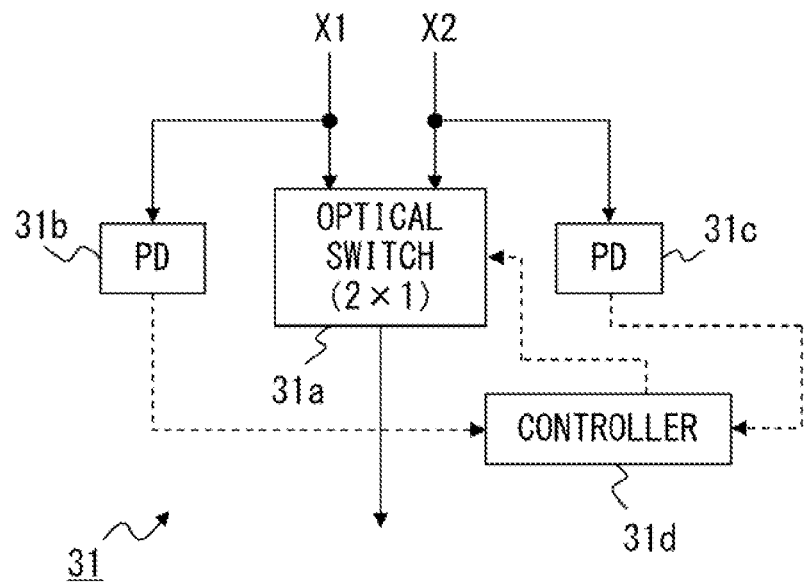
F I G. 4

|  | | SHUTOFF SIGNAL | |
|---|---|---|---|
|  | | 1 | 0 |
| WCF SIGNAL | 1 | SHUTOFF | SHUTOFF CANCELLATION |
| | 0 | SHUTOFF CANCELLATION | SHUTOFF CANCELLATION |

FIG. 6

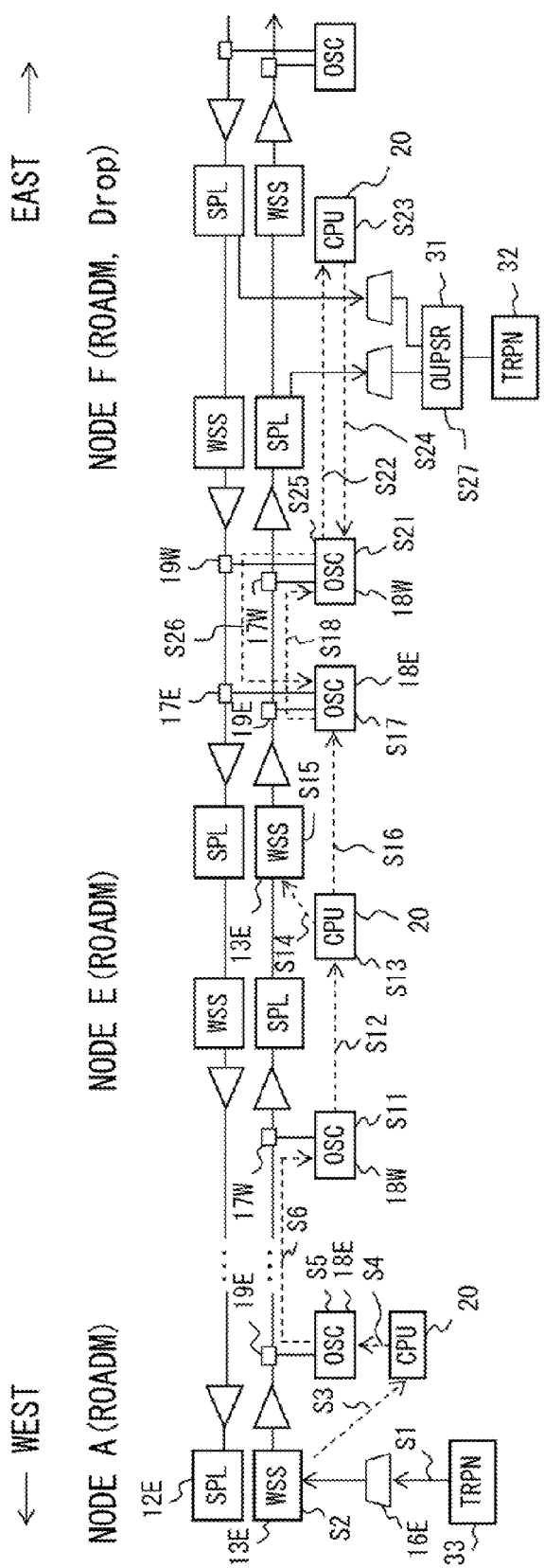
F I G. 9

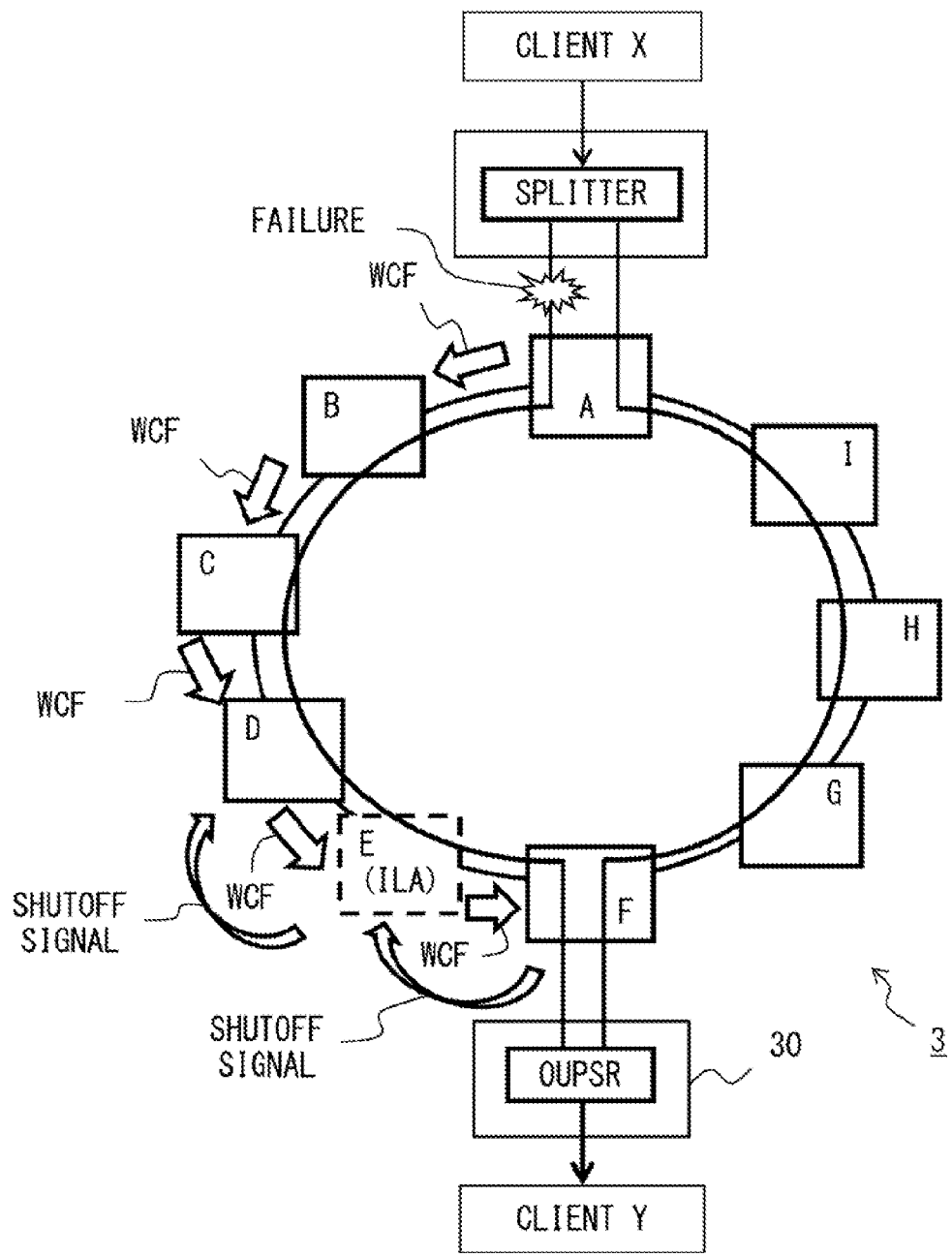
F I G. 14

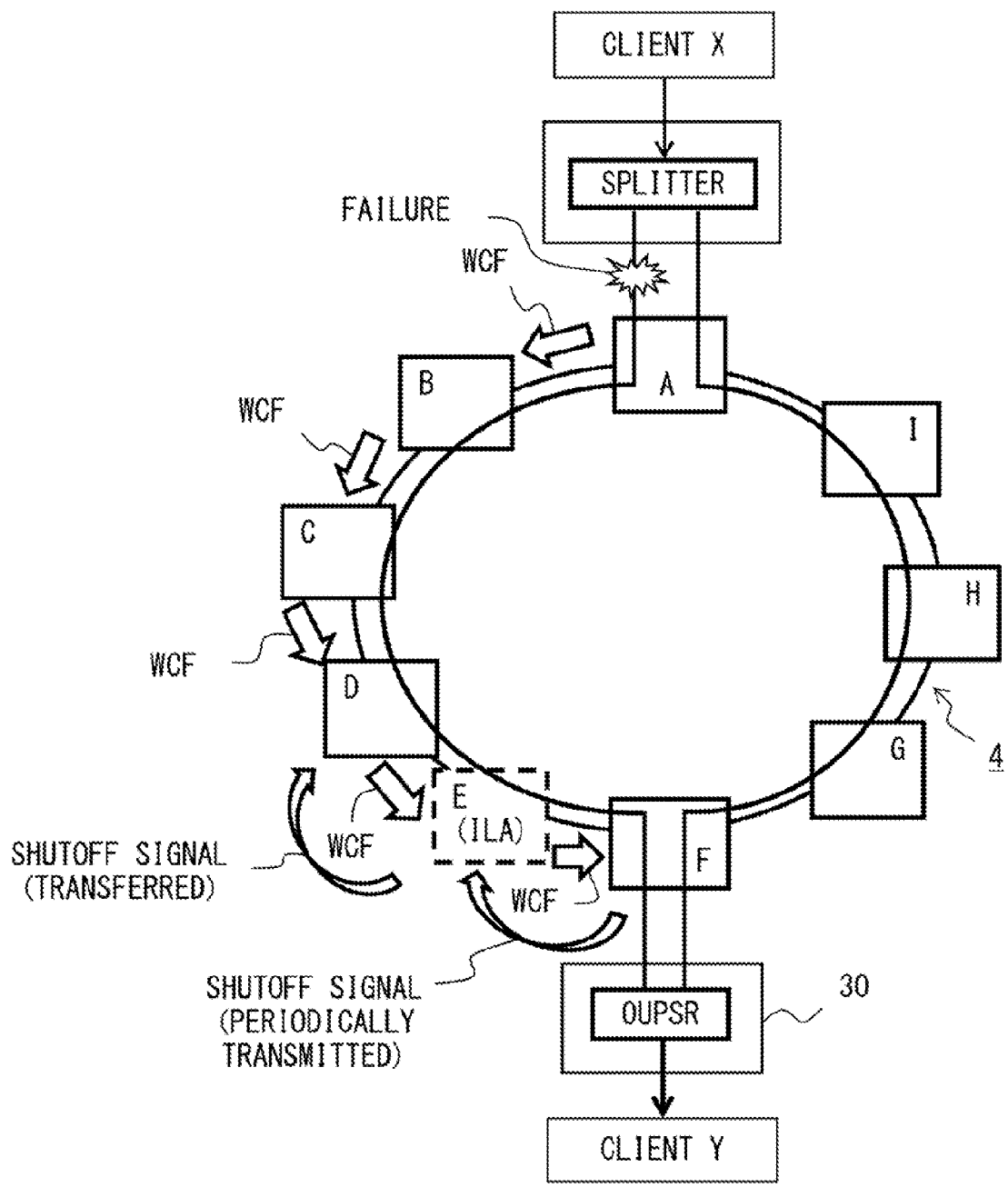
F I G. 17

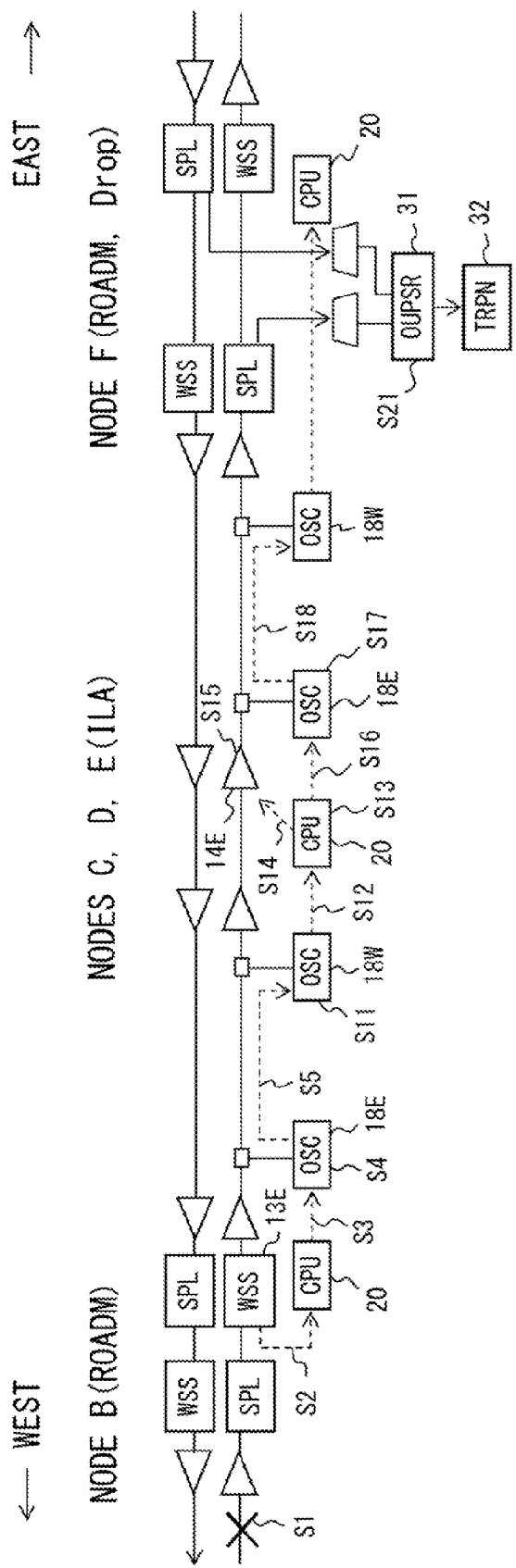
F I G. 24

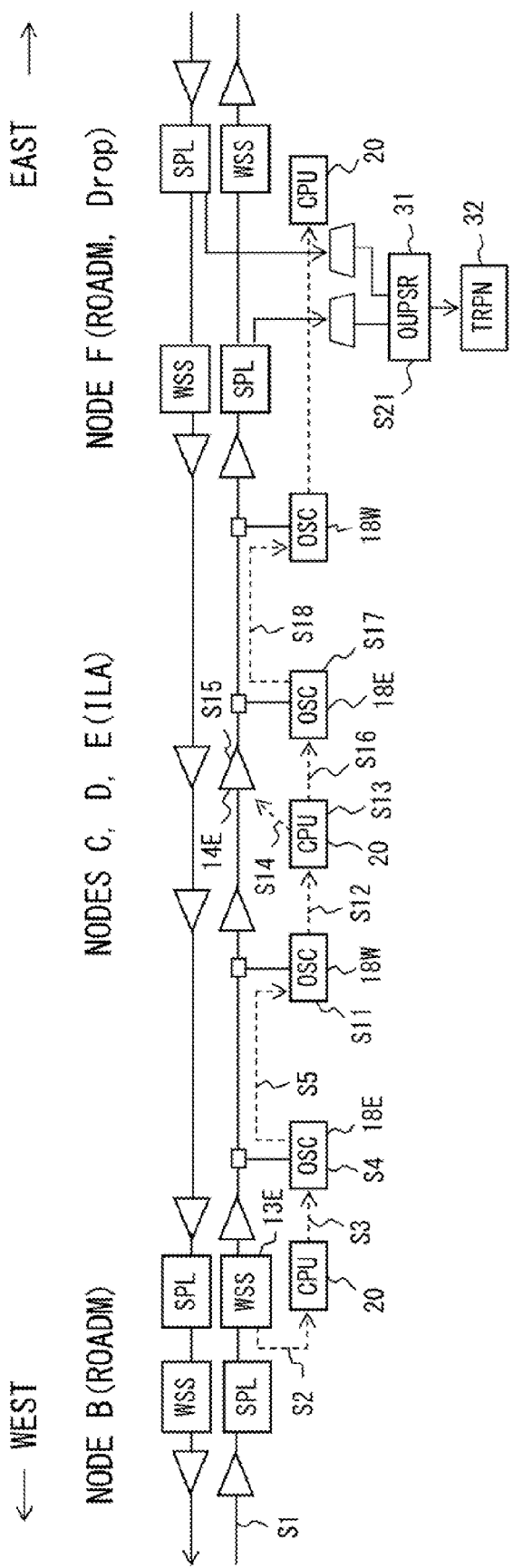
F I G. 2 5

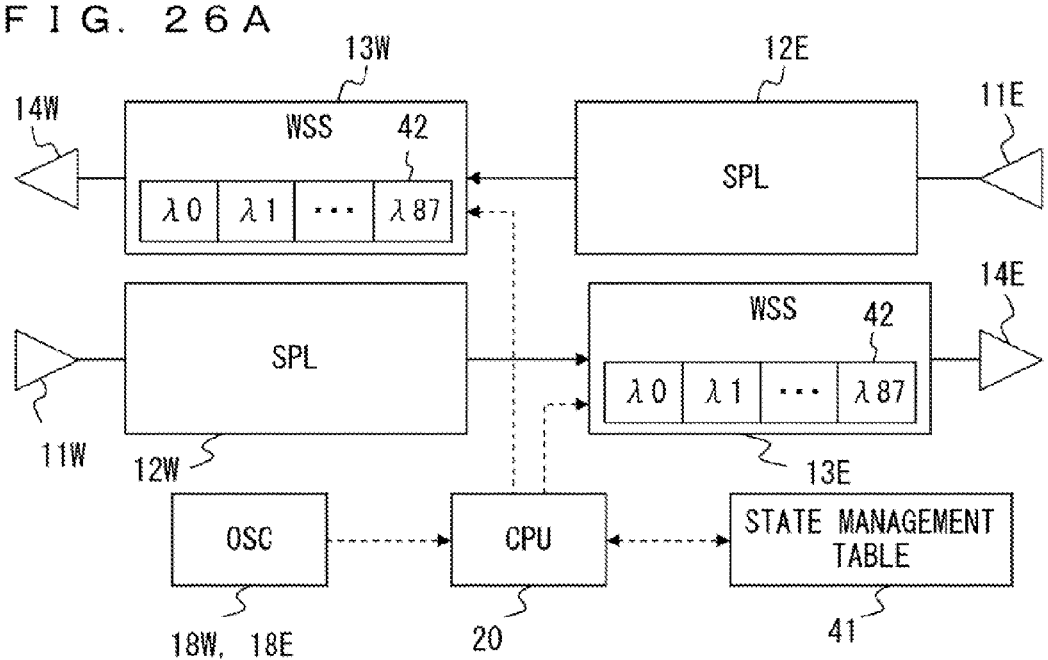

FIG. 28A

SUB-NETWORK 1 (EACH SPAN)

| NID-degree | | NID-degree |
|---|---|---|
| N1-A | ↔ | N2-B |
| N2-A | ↔ | N3-B |
| N3-A | ↔ | N4-B |
| N4-A | ↔ | N1-B |

SUB-NETWORK 2 (EACH SPAN)

| NID-degree | | NID-degree |
|---|---|---|
| N5-B | ↔ | N6-A |
| N6-B | ↔ | N3-C |
| N3-D | ↔ | N7-A |
| N7-B | ↔ | N5-A |

FIG. 28B

TRAFFIC 1

| N2 | | N3 | | N4 | |
|---|---|---|---|---|---|
| B | | A | B | A | |
| T | | λ1 | λ1 | T | |

TRAFFIC 2

| N5 | | N6 | | N3 | | N7 | |
|---|---|---|---|---|---|---|---|
| A | | B | A | C | D | A | B |
| T | | λ2 | λ2 | λ2 | λ3 | λ3 | T |

| λ | Deg A | | Deg B | | Deg C | | Deg D | |
|---|---|---|---|---|---|---|---|---|
|   | CONNECTION | ADJACENT | CONNECTION | ADJACENT | CONNECTION | ADJACENT | CONNECTION | ADJACENT |
| 1 | Deg B-1 | 1 | Deg A-1 | 1 |          |   |          |   |
| 2 |         |   |         |   | Deg D-3 | 1 |          |   |
| 3 |         |   |         |   |         |   | Deg C-2 | 0 |

SUB-NETWORK 1

| SPAN | SOURCE NODE/ROUTE | DESTINATION NODE/ROUTE |
|---|---|---|
| 1-WEST | N1-A | N2-B |
| 1-EAST | N2-B | N1-A |
| 2-WEST | N2-A | N3-B |
| 2-EAST | N3-B | N2-A |
| 3-WEST | N3-A | N4-B |
| 3-EAST | N4-B | N3-A |
| 4-WEST | N4-A | N1-B |
| 4-EAST | N1-B | N4-A |

SUB-NETWORK 2

| SPAN | SOURCE NODE/ROUTE | DESTINATION NODE/ROUTE |
|---|---|---|
| 1-EAST | N5-B | N6-A |
| 1-WEST | N6-A | N5-B |
| 2-EAST | N6-B | N3-C |
| 2-WEST | N3-C | N6-B |
| 3-EAST | N3-D | N7-A |
| 3-WEST | N7-A | N3-D |
| 4-EAST | N7-B | N5-A |
| 4-WEST | N5-A | N7-B |

TRAFFIC 1   EAST

| N2 | | N3 | | N4 | |
|---|---|---|---|---|---|
| B | A | B | A | B | A |
| Add | λ1 | λ1 | λ1 | λ1 | Drop |

TRAFFIC 1   WEST

| N4 | | N3 | | N2 | |
|---|---|---|---|---|---|
| A | B | A | B | A | B |
| Add | λ1 | λ1 | λ1 | λ1 | Drop |

TRAFFIC 2   EAST

| N7 | | N3 | | N6 | | N5 | |
|---|---|---|---|---|---|---|---|
| B | A | D | C | B | A | B | A |
| Add | λ3 | λ3 | λ2 | λ2 | λ2 | λ2 | Drop |

TRAFFIC 2   WEST

| N5 | | N6 | | N3 | | N7 | |
|---|---|---|---|---|---|---|---|
| A | B | A | B | C | D | A | B |
| Add | λ2 | λ2 | λ2 | λ2 | λ3 | λ3 | Drop |

F I G.  3 1

OPTICAL TRANSMISSION SYSTEM AND NOISE SUPPRESSION METHOD

CROSS-REFERENCE TO RELATED APPLICATION

This application is based upon and claims the benefit of priority of the prior Japanese Patent Application No. 2011-205315, filed on Sep. 20, 2011, the entire contents of which are incorporated herein by reference.

FIELD

The embodiments described herein are related to a noise suppression method in an optical transmission system.

BACKGROUND

A WDM (Wavelength Division Multiplexing) transmission system is in practical use as one form of an optical transmission system. With WDM, a plurality of optical signals having different wavelengths are multiplexed and transmitted. As a method or a configuration for recovery from a transmission line failure in a WDM transmission system, an OUPSR (Optical Unidirectional Path Switched Ring) is known.

FIG. 1 is an explanatory view of the OUPSR. In the example illustrated in FIG. 1, a WDM transmission system includes node equipments A to I, which are connected in the form of a ring. Moreover, the node equipments A to I can respectively transmit an optical signal in a clockwise direction and a counterclockwise direction.

The following description assumes that data is transmitted from a client X to a client Y. In this case, the node equipment A guides an optical signal X1 to the node equipment B, and also guides an optical signal X2 to the node equipment I. Namely, the optical signal X1 is transmitted in the counterclockwise direction, whereas the optical signal X2 is transmitted in the clockwise direction. The optical signals X1 and X2 are substantially the same each other, and propagate data transmitted from the client X. Moreover, each of the optical signals X1 and X2 is multiplexed into a corresponding WDM optical signal and transmitted.

The node equipment F extracts the optical signal X1 from the WDM optical signal received via the node equipments B, C, D and E, and guides the extracted optical signal X1 to an OUPSR device. Moreover, the node equipment F extracts the optical signal X2 from the WDM optical signal received via the node equipments I, H and G, and guides the extracted optical signal X2 to the OUPSR device. Namely, the OUPSR device receives both of the optical signals X1 and X2. Then, the OUPSR device selects one of the optical signals X1 and X2, and guides the selected signal to the client Y. Here, assume that the OUPSR device selects the optical signal X1 and guides the selected signal to the client Y.

Assume that the optical signal X1 transmitted from the node equipment A in the counterclockwise direction does not reach the node equipment F due to a failure in the WDM transmission system with the above described configuration. Here, the OUPSR device continuously monitors reception levels of the optical signals X1 and X2. If the reception level of the optical signal X1 becomes lower than a specified threshold, the OUPSR device detects LOL (Loss of Light) of the optical signal X1. Then, the OUPSR device guides the optical signal X2 received via the node equipments I, H and G to the client Y. Namely, the OUPSR device switches an optical path for transmitting data from the client X to the client Y. In this way, the OUPSR device switches an optical path when a failure has occurred on a transmission line, whereby the data transmission is recovered.

Note that optical path switching performed due to a failure can be implemented with another method. For example, node equipment that has detected LOL of a certain wavelength channel may notify a failure signal to an OUPSR device that drops the wavelength channel. In this case, the OUPSR device switches an optical path of the wavelength channel according to the failure signal.

Related techniques are as follows. International Publication Pamphlet No. WO2009/022406 describes an optical receiver that can instantaneously detect optical signal LOL of an optical channel. International Publication Pamphlet No. WO2005/008924 describes a transmission route switching control method. Japanese Laid-Open Patent Publication No. 2009-130505 describes a method of setting a threshold for detecting an optical input LOL. Japanese Laid-Open Patent Publication No. 2008-252657 describes a method for identifying a failure in a connection between domains in an optical network.

As described above, optical path switching is implemented, for example, by monitoring an optical level of a received signal in an OUPSR device. However, for example, when a transmission line from a location where LOL of a certain wavelength channel has occurred to a node (namely, a drop node) that drops the wavelength channel from a WDM optical signal is long and many nodes are provided on the transmission line, the OUPSR device cannot suitably monitor a level of an optical signal in some cases.

Assume that a failure occurs in the optical signal X1 in the node equipment A in the example illustrated in FIG. 1. Since the optical signal X1 is dropped from the WDM optical signal in the node equipment F and guided to the client Y, the node equipment F is a drop node of the optical signal X1. In this case, the node equipment F drops a wavelength (hereinafter referred to as λx allocated to the optical signal X1, and guides the signal to the OUPSR device.

Incidentally, each of the node equipments includes an optical amplifier to amplify a WDM optical signal. The optical amplifier generates ASE (Amplified Spontaneous Emission) noise. Accordingly, ASE Noise is accumulated in the node equipments B, C, D and E arranged on a transmission line from the node equipment A to the node equipment F. Therefore, when the node equipment F drops the wavelength λx from the WDM optical signal and guides the signal to the OUPSR device in a case where the optical path of the optical signal X1 is disconnected, an optical level detected by the OUPSR device sometimes becomes higher than a threshold for detecting LOL. In this case, the OUPSR device cannot detect LOL of the optical signal X1. Therefore, the optical path is not switched. Namely, a data communication between the clients X and Y is not recovered.

In the meantime, to switch an optical path by using the above described failure signal, not only the node equipments but the OUPSR device needs to support recovery protocol using the failure signal. However, it is preferable that each of the node equipments can accommodate an arbitrary communication device in order to flexibly configure an optical transmission system. Accordingly, an OUPSR device that does not support the recovery protocol using the failure signal is sometimes connected to a node equipment. Since the OUPSR device cannot detect a failure in this case, an optical path is not switched.

The above described problem does not occur only in an optical transmission system employing an OUPSR. That is, the above described problem may occur in an optical transmission system where an optical path is switched due to a failure.

SUMMARY

According to and aspect of the embodiments, a noise suppression method is used in an optical transmission system which includes a plurality of node equipments transmitting a WDM optical signal, and in which first node equipment drops a first optical signal from the WDM optical signal and guides the dropped first optical signal to a communication device, The noise suppression method includes: transmitting a failure signal that specifies the first optical signal from second node equipment to the first node equipment via a first route when the second node equipment arranged on the first route for transmitting the first optical signal to the first node equipment has detected a failure of the first optical signal; transmitting a shutoff signal that specifies the first optical signal from the first node equipment toward the second node equipment via the first route; and shutting off an optical output of a wavelength corresponding to the first optical signal in third node equipment that has relayed the failure signal and has received the shutoff signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates a configuration of OUPSR unit;

FIG. 6 illustrates shutoff control conditions;

FIG. 9 is an explanatory view of shutoff cancellation operation according to the first embodiment;

FIG. 14 is an explanatory view of an outline of a third embodiment;

FIG. 17 is an explanatory view of an outline of a fourth embodiment;

FIG. 24 is an explanatory view of shutoff operation according to the sixth embodiment;

FIG. 25 is an explanatory view of shutoff cancellation operation according to the sixth embodiment;

FIGS. 26A and 26B are explanatory views of a shutoff control method according to a seventh embodiment;

FIGS. 28A and 28B illustrate implementation examples of a network topology/routing DB;

FIG. 29 illustrates one example of a wavelength path connection state management table;

FIG. 30 illustrates another implementation example of topology information; and

FIG. 31 illustrates another implementation example of routing information.

DESCRIPTION OF EMBODIMENTS

An optical transmission system according to an embodiment of the present invention includes a plurality of node equipments that transmit a WDM optical signal. The optical transmission system according to the embodiment has a function of suppressing noise of a wavelength channel in order to suitably monitor an optical level of the wavelength channel when a failure has occurred on the wavelength channel. Some embodiments are described below.

First Embodiment

Figure 1:
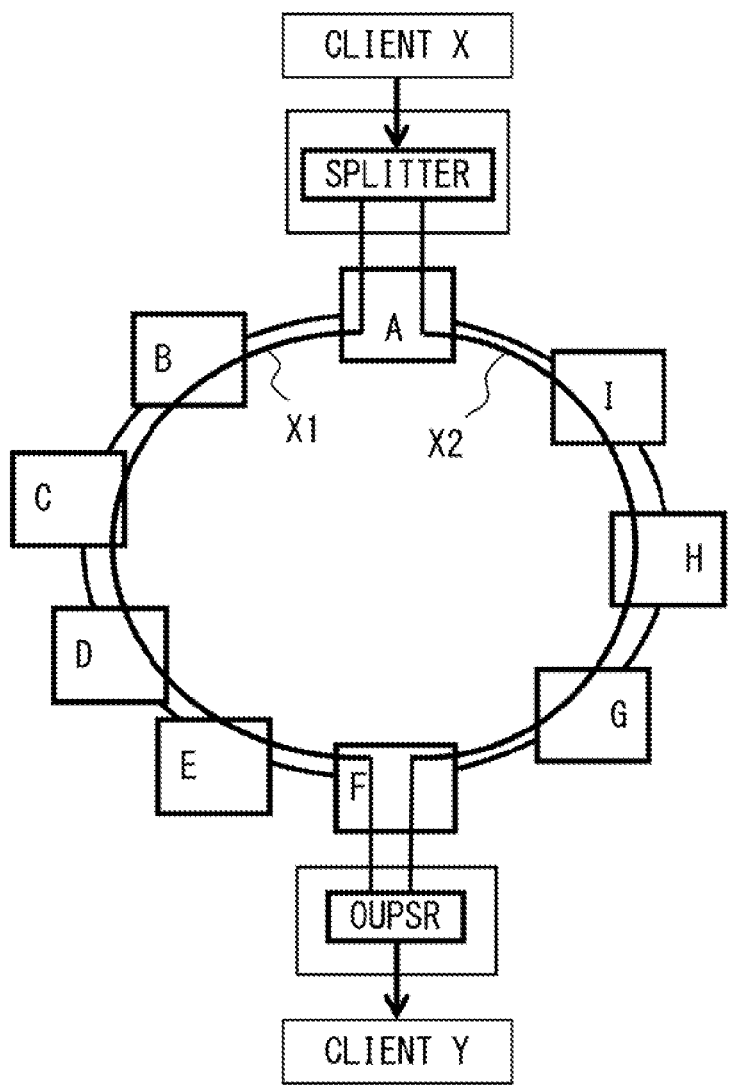
FIG. 1 is an explanatory view of an OUPSR.
Figure 2:
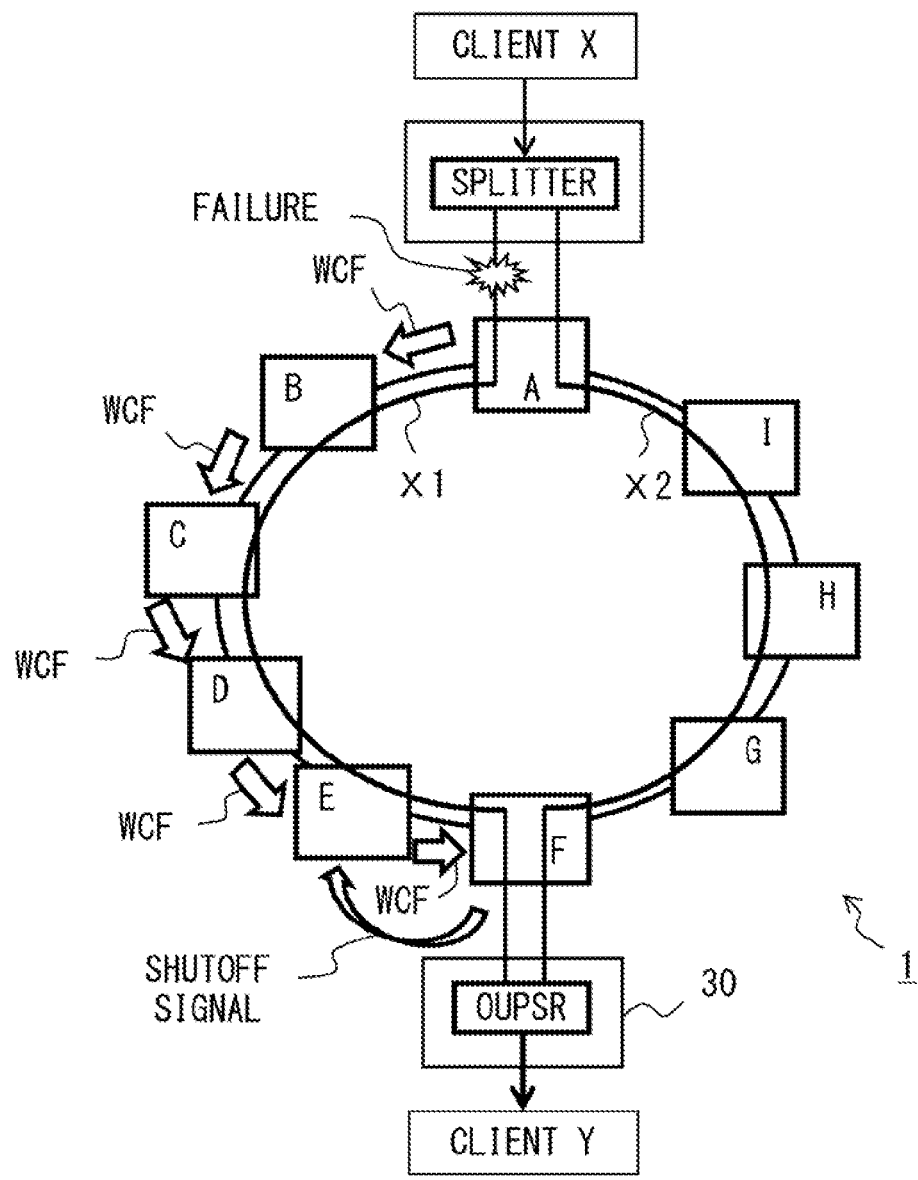
FIG. 2 is an explanatory view of an outline of a first embodiment.

FIG. 2 is an explanatory view of an outline of a first embodiment. In an example illustrated in FIG. 2, a WDM transmission system 1 includes node equipments A to I. Each of the node equipments A to I is a ROADM (Reconfigurable Optical Add-Drop Multiplexer) in this example. Moreover, the node equipments A to I are connected with optical fibers in the form of a ring. Here, the WDM transmission system 1 can transmit an optical signal in a clockwise direction and a counterclockwise direction. Namely, a bidirectional transmission line is provided between nodes.

Each of the node equipments A to I can accommodate client equipment. The client equipment may accommodate a client (or a router and the like). In the example illustrated in FIG. 2, client equipment 30 is connected to the node equipment F.

Assume that data is transmitted from a client X to a client Y in the WDM transmission system 1 having the above described configuration. The client X is accommodated by the node equipment A. In the meantime, the client Y is accommodated by the node equipment F via client equipment 30.

In this case, the data signal from the client X is split into first and second data signals by a splitter. The first and second data signals are substantially the same each other. The node equipment A generates an optical signal X1 transmitted in the counterclockwise direction, and an optical signal X2 transmitted in the clockwise direction. The optical signals X1 and X2 are generated from the first and second data signals, respectively. The node equipment A guides the optical signal X1 to the node B, and guides the optical signal X2 to the node I. Here, the optical signals X1 and X2 are mutually substantially the same, and propagate data transmitted from the client X. Moreover, the optical signals X1 and X2 are respectively multiplexed into a WDM optical signal.

The node equipment F extracts the optical signal X1 from the WDM optical signal received via the nodes B, C, D and E, and guides the extracted signal X1 to the client equipment 30. The node equipment F also extracts the optical signal X2 from the WDM optical signal received via the nodes I, H and G, and guides the extracted signal X2 to the client equipment 30. Namely, the client equipment 30 receives both of the optical signals X1 and X2. Then, the client equipment 30 selects one of the optical signals X1 and X2, and guides the selected signal to the client Y. Here, assume that the client equipment 30 selects the optical signal X1 and guides the selected signal to the client Y. A function of selecting either of the optical signals X1 and X2 is implemented by an OUPSR unit to be described later.

In the following description, node equipment that drops a certain optical signal (or a certain wavelength channel) from a WDM optical signal and guides the dropped signal to a client is sometimes referred to as "drop node equipment". For example, drop node equipment of the optical signal X1 is the node equipment F in the example illustrated in FIG. 2.

Figure 3:
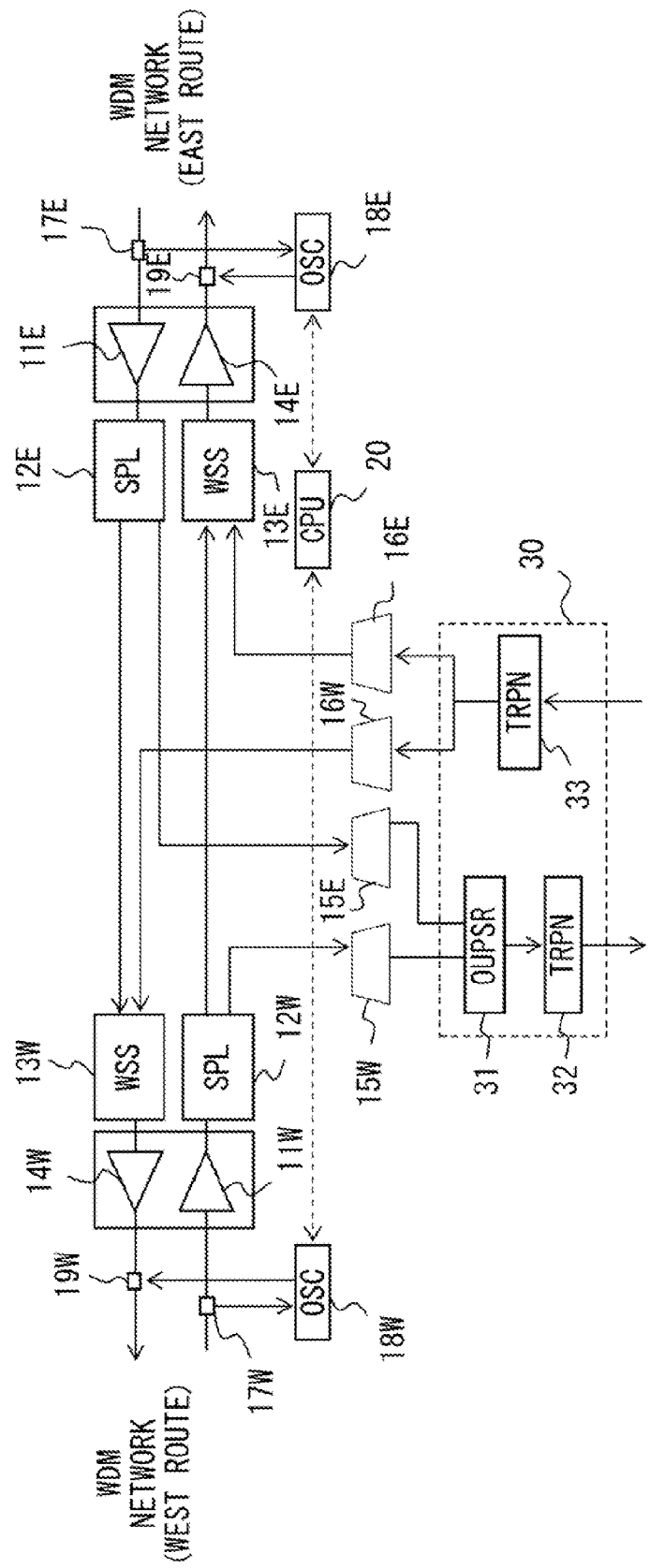
FIG. 3 illustrates a configuration of a ROADM.

FIG. 3 illustrates a configuration of a ROADM provided in each of the nodes. Namely, FIG. 3 illustrates a configuration of each of the node equipments A to I. In the example illustrated in FIG. 3, the ROADM has a 2-degree configuration. Namely, the ROADM has two (WEST and EAST) routes. Moreover, only one client equipment 30 is connected to the ROADM in FIG. 3. However, the ROADM can accommodate a plurality of client equipments 30.

An optical amplifier 11W amplifies a WDM optical signal input from the WEST route. Here, the WDM optical signal input from a WDM network to the ROADM includes a main signal and an OSC signal. The main signal includes a plurality of optical signals having different wavelengths. Namely, the main signal is also a WDM optical signal. Each of the optical signals included in the main signal transmits data, for example, between clients. The OSC (Optical Supervisory Channel) signal transmits control information as will be described later. To the OSC signal, a wavelength different from the main signal is allocated. An OSC filter 17W extracts the OSC signal from the input WDM optical signal, and guides the extracted signal to an OSC controller 18W. The OSC filter 17W also guides, to an optical amplifier 11W, the WDM optical signal (namely, the main signal) from which the OSC signal has been extracted. Accordingly, the optical amplifier 11W amplifies the WDM optical signal (namely, the main signal) from which the OSC signal has been extracted.

An optical splitter (SPL) 12W guides the WDM optical signal amplified by the optical amplifier 11W to a wavelength selective switch (WSS) 13E and a demultiplexer (DMUX) 15W. The demultiplexer 15W demultiplexes the WDM optical signal guided from the optical splitter 12W into wavelengths. Optical signals obtained by the demultiplexer 15W are respectively guided to a corresponding optical fiber. However, FIG. 3 illustrates only one of the plurality of outputs of the demultiplexer 15W. The optical signal output from the demultiplexer 15W is guided to the OUPSR unit 31 of the client equipment 30.

Operations of an OSC filter 17E, an optical amplifier 11E, an optical splitter 12E and a demultiplexer 15E are substantially the same as those of the OSC filter 17W, the optical amplifier 11W, the optical splitter 12W and the demultiplexer 15W, respectively. Accordingly, the optical signal output from the demultiplexer 15E is also guided to the OUPSR unit 31 of the client equipment 30.

As described above, the OUPSR unit 31 of the client equipment 30 receives an optical signal dropped from the WDM optical signal received from the WEST route, and an optical signal dropped from the WDM optical signal received from the EAST route. The OUPSR unit 31 selects either of the two optical signals, and guides the selected signal to a transponder (TRPN) 32. The transponder 32 guides the optical signal selected by the OUPSR unit 31 to the client. At this time, the transponder 32 may convert a signal format on a WDM network into that on a client line.

FIG. 4 illustrates a configuration of one example of the OUPSR unit 31. The OUPSR unit 31 includes an optical switch 31a, photo detectors (PDs) 31b and 31c, and a controller 31d.

The optical switch 31a selects either of two input optical signals according to an instruction of the controller 31d. The optical signals X1 and X2 are respectively guided from the demultiplexers 15W and 15E. The photo detectors 31b and 31c respectively convert the optical signals X1 and X2 into electric signals. The controller 31d detects optical powers (optical levels) of the optical signals X1 and X2 by using the electric signals obtained by the photo detectors 31b and 31c. Then, the controller 31d controls the optical switch 31a based on the optical powers of the optical signals X1 and X2.

At an initial settings, the controller 31d compares optical powers of the optical signals X1 and X2. When the optical power of the optical signal X1 is higher, the controller 31d causes the optical switch 31a to select the optical signal X1. Alternatively, when the optical power of the optical signal X2 is higher, the controller 31d causes the optical switch 31a to select the optical signal X2.

After the initial settings, the controller 31d monitors the optical power of the optical signal selected by the optical switch 31a. When the optical power of the selected optical signal becomes lower than a specified threshold, the controller 31d causes the optical switch 31a to select the other optical signal. The threshold is used to decide whether or not an optical signal is in an LOL (Loss of Light) state. For example, when the optical power of the optical signal X1 becomes lower than the threshold while the optical signal X1 is being selected, the controller 31d causes the optical switch 31a to select the optical signal X2. As a result, path switching of the wavelength channel is implemented.

As described above, the OUPSR unit 31 monitors the optical power of an input optical signal, and performs path switching of a wavelength channel according to a monitor result. Accordingly, path switching is performed when a failure occurs on a wavelength channel, whereby a data transmission is recovered.

Referring back to FIG. 3. A transponder (TRPN) 33 guides an optical signal transmitted from a client to multiplexers (MUXs) 16W and 16E. At this time, the transponder 33 may convert the signal format on the client line into that on the WDM network. In addition, the transponder 33 may convert a wavelength of the optical signal. Note that the splitter illustrated in FIG. 2 and some other similar drawings may be implemented in the transponder 33 or at the output side of the transponder 33.

The multiplexer 16W multiplexes optical signals output from a plurality of client equipments. The optical signals multiplexed by the multiplexer 16W are guided to a wavelength selective switch 13W.

To the wavelength selective switch 13W, a WDM optical signal transmitted from the EAST route, and the optical signals multiplexed by the multiplexer 16W are input. The wavelength selective switch 13W selects a wavelength specified by a CPU 20. By so doing, an optical signal transmitted from the client is added to the WDM optical signal that is input from the EAST route and output to the WEST route. Note that the CPU 20 may control the wavelength selective switches 13W and 13E, for example, according to an instruction issued from a network management system not illustrated.

An optical amplifier 14W amplifies the WDM optical signal output from the wavelength selective switch 13W. Then, an OSC coupler 19W adds an OSC signal generated by the OSC controller 18W to the WDM optical signal amplified by the optical amplifier 14W.

Operations of the multiplexer 16E, the wavelength selective switch 13E, the optical amplifier 14E and the OSC coupler 19E are substantially the same as those of the multiplexer 16W, the wavelength selective switch 13W, the optical amplifier 14W and the OSC coupler 19W, respectively. Accordingly, an optical signal transmitted from the client is added to the WDM optical signal that is input from the WEST route and output to the EAST route. At this time, an OSC signal is also added to the WDM optical signal output to the EAST route.

Each of the wavelength selective switches 13W and 13E has an OCM (Optical Channel Monitor). The OCM monitors optical power of each wavelength. Accordingly, each of the wavelength selective switches 13W and 13E can detect a failure (such as LOL (Loss of Light)) of each wavelength channel by using the OCM. For example, when optical power of a certain wavelength channel becomes lower than a specified threshold, it is decided that a failure has been occurred on the wavelength channel (or in an optical signal of the wavelength channel).

The wavelength selective switches 13W and 13E are merely one example of a wavelength selecting device, and may be replaced with another device. For example, the ROADM may be configured to include a wavelength blocker as a replacement for a wavelength selective switch. However, in the configuration including the wavelength blocker, a client signal is added to a WDM optical signal by using a WDM coupler or the like.

Each of the OSC controllers 18W and 18E terminates an OSC signal extracted from an input WDM optical signal, and converts the signal into an electric signal. Each of the OSC controllers 18W and 18E obtains control information transmitted by the OSC signal, and provides the control information to the CPU 20. Moreover, each of the OSC controllers 18W and 18E generates an OSC signal according to an instruction issued from the CPU 20. The generated OSC signal is added to an output WDM optical signal by the OSC coupler 19W or 19E as described above.

The CPU 20 controls operations of the ROADM. At this time, the CPU 20 controls the wavelength selective switches 13W and 13E according to control information included in the received OSC signal. Moreover, the CPU 20 causes the OSC controllers 18W and 18E to generate an OSC signal.

Figure 5:
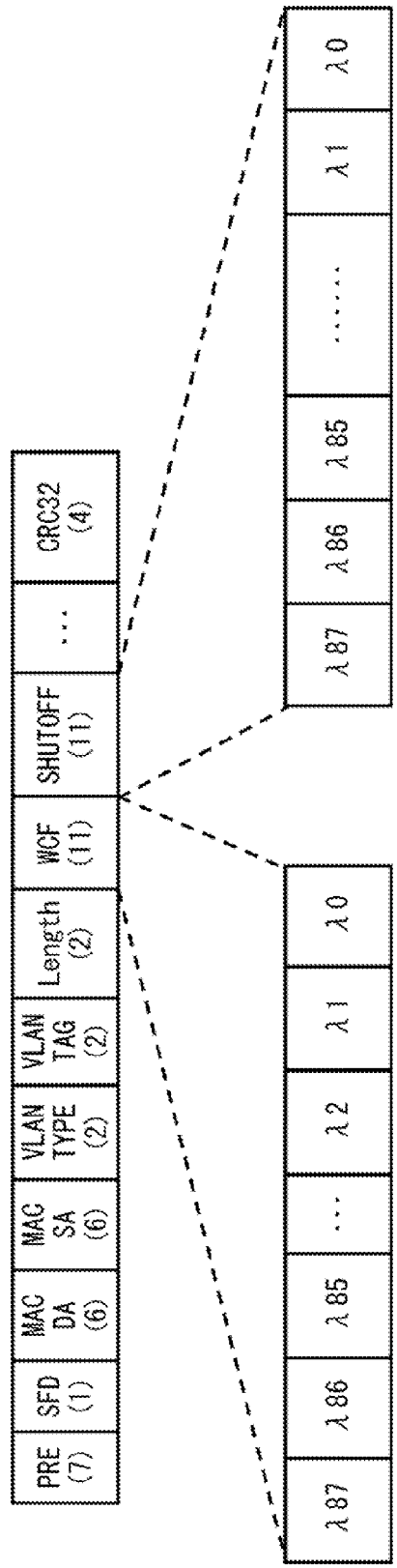
FIG. 5 illustrates one example of an OSC frame transmitted by an OSC signal.

FIG. 5 illustrates one example of a format of an OSC frame transmitted by the OSC signal. In this embodiment, an Ethernet (registered trademark) format is employed for the OSC frame. The OSC frame includes WCF information and shutoff information within a data area. Each ROADM generates an OSC frame, for example, periodically, and transmits the generated frame to an adjacent node.

MACDA (MAC Destination Address) and MACSA (MAC Source Address) respectively represent a termination point and an origination point of the OSC signal.

A WCF (Wavelength Channel Failure) signal represents whether or not a failure occurs on each wavelength channel of a WDM system. In this embodiment, 1 bit is assigned to each wavelength channel. "1" represents a state where a failure occurs, whereas "0" represents a state where a failure does not occur. In the example illustrated in FIG. 5, the WDM system provides 88 wavelength channels ($\lambda 0$ to $\lambda 87$). Note that the WCF information is stored in the OSC frame and transmitted as a WCF signal. The WCF signal is one example of a failure signal.

The shutoff information indicates whether or not to perform shutoff for each wavelength channel of the WDM system. In this embodiment, 1 bit is assigned to each wavelength channel. "1" represents a state where shutoff is performed, whereas "0" represents a state where shutoff is not performed. The shutoff information is stored in the OSC frame, and transmitted as a shutoff signal.

Operations of the WDM transmission system 1 performed when a failure is detected are described next with reference to FIG. 2. Here, assume that the node equipment A detects a failure of an optical signal transmitted from the client X to the client Y in the counterclockwise direction. The detected failure is LOL (Loss of Light). Also assume that a wavelength of this optical signal remains unchanged as $\lambda 1$ on a route starting from the node equipment A to the node equipment F via the node equipments B, C, D and E. Therefore, an optical signal (or a wavelength channel) from which the above described failure is detected is sometimes referred to as an "optical signal $\lambda 1$" (or a "wavelength channel $\lambda 1$") in the following description.

The node equipment A transmits a WCF signal that specifies the optical signal $\lambda 1$ upon detection of the failure of the optical signal $\lambda 1$. At this time, the node equipment A generates a WCF signal that specifies the optical signal $\lambda 1$ by setting "1" to the $\lambda 1$ bit of the WCF information illustrated in FIG. 5. Then, the WCF signal is transmitted to the same route (namely, in the counterclockwise direction) as the optical signal $\lambda 1$ from which the failure has been detected.

Each of the node equipments B, C, D and E transfers the WCF signal to the next node equipment. Namely, the WCF signal transmitted from the node equipment A is sequentially relayed by the node equipments B, C, D and E, and transmitted up to the node equipment F. As a result, the node equipment F receives the WCF signal that specifies the optical signal $\lambda 1$. The node equipment F generates a shutoff signal that specifies the optical signal $\lambda 1$ upon receipt of the WCF signal (that specifies the optical signal $\lambda 1$). This shutoff signal is generated by setting "1" to the $\lambda 1$ bit of the shutoff information illustrated in FIG. 5. Then, the node equipment F transmits the shutoff signal in a reverse direction (namely, the clockwise direction) on the route where the optical signal $\lambda 1$ is transmitted. As a result, the node equipment E receives the shutoff signal that specifies the optical signal $\lambda 1$.

Each of the node equipments determines whether or not to shut off an optical output of each wavelength channel, based on the WCF signal and the shutoff signal. At this time, each of the node equipments determines whether or not to shut off the optical output of each wavelength channel, according to the control condition illustrated in FIG. 6. Namely, each of the node equipments shuts off the optical output of a corresponding wavelength channel on the condition that the WCF signal is "1" and the shutoff signal is "1".

In the example illustrated in FIG. 2, each of the node equipments B, C, D, E and F receives the WCF signal that specifies $\lambda 1$. That is, the WCF signal for $\lambda 1$ is "1" at the node equipments B, C, D, E and F. Moreover, the node equipment E receives the shutoff signal that specifies $\lambda 1$. That is, the shutoff signal for $\lambda 1$ is "1" at the node equipments E. Accordingly, the node equipment E shuts off the optical output of $\lambda 1$.

Note that the shutoff of the optical output of a specified wavelength is implemented by the wavelength selective switch 13E or 13W.

Figure 7:
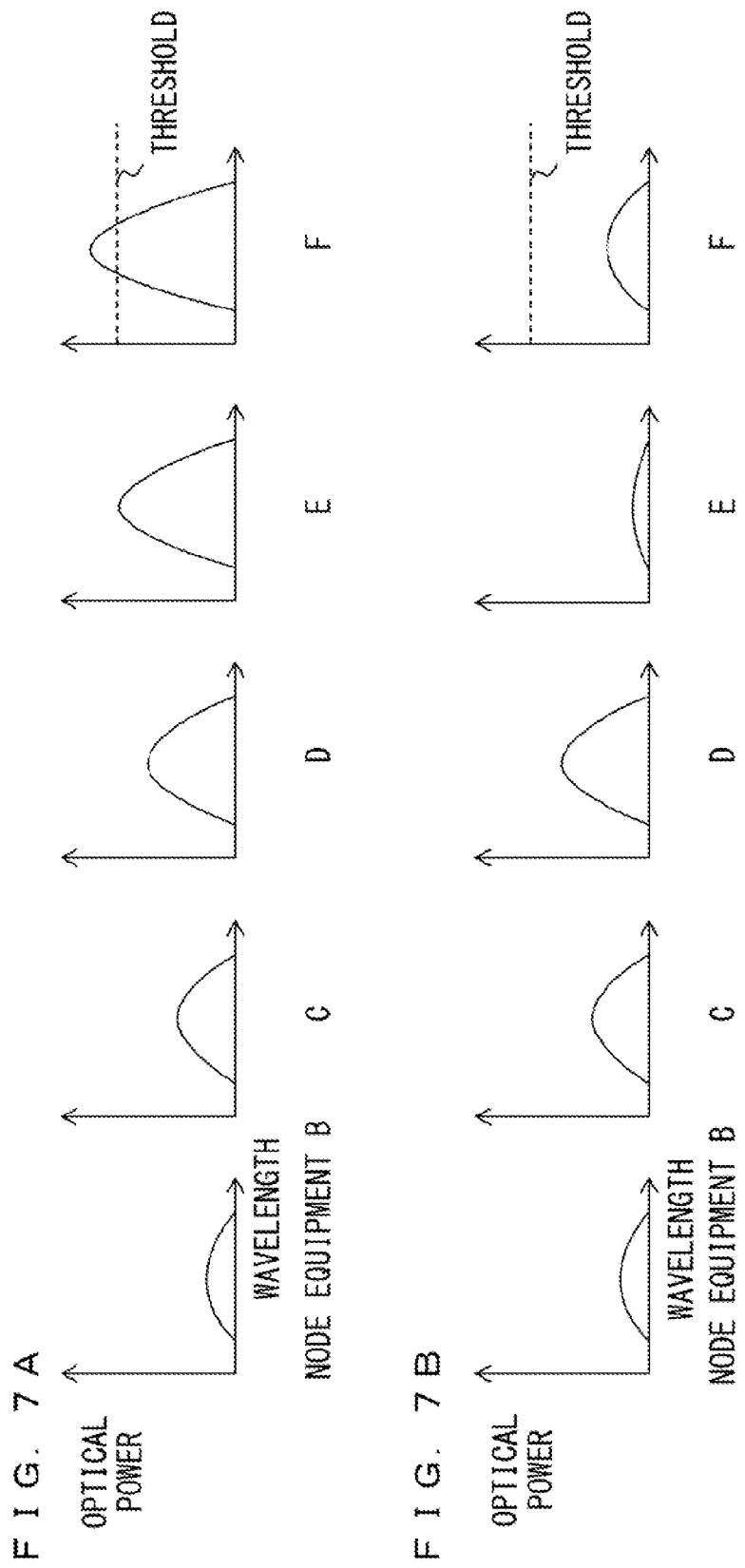
FIGS. 7A and 7B are explanatory views of effects according to shutoff.

FIGS. 7A and 7B are explanatory views of effects according to shutoff. Here, assume that the optical signal having the wavelength λ1 has entered an LOL state in the node equipment A. FIGS. 7A and 7B illustrate output optical powers of the wavelength λ1 of the node equipments B to F. Note that FIGS. 7A and 7B schematically illustrate spectra for the purpose of an explanation.

FIG. 7A illustrates optical outputs of the wavelength λ1 of the node equipments B through F when shutoff is not performed. In this example, the wavelength λ1 is in the LOL state. However, each of the node equipments has the optical amplifiers (11W, 11E, 14W and 14E) for amplifying a WDM optical signal. The optical amplifiers generate ASE noise. Accordingly, ASE noise is gradually accumulated on the route starting from the node equipment B to the node equipment F although the optical signal having the wavelength λ1 is not present. In FIGS. 7A and 7B, ASE noise is generated and accumulated only for a particular wavelength (in this case, λ1). Actually, however, ASE noise is generated mostly independent of a wavelength.

In the example illustrated in FIG. 7A, optical power is higher than a threshold due to the accumulated ASE noise in the node equipment F. This threshold is used to detect the LOL (Loss of Light) state of an optical signal for a specified wavelength as described earlier with reference to FIG. 4. Accordingly, if the node equipment F drops the wavelength λ1 from the input WDM optical signal and guides the dropped signal to the OUPSR unit 31, the OUPSR unit 31 accidentally determines that the optical signal λ1 is normal.

To solve this problem, in the WDM transmission system 1 according to the first embodiment, node equipment immediately preceding a drop node of an optical signal where a failure has occurred shuts off an optical output of the wavelength corresponding to the failed optical signal. Namely, the node equipment E shuts off the optical output of the wavelength λ1 by using the wavelength selective switch. Accordingly, the output optical power of the wavelength λ1 becomes sufficiently low in the node equipment E as illustrated in FIG. 7B. The optical amplifier is provided on the output side of the wavelength selective switch as illustrated in FIG. 3, and ASE noise is generated by the optical amplifier. Therefore, the output optical power of the node equipment E is not zero.

Since the node equipment E shuts off the optical output of the wavelength λ1, an ASE noise component of the wavelength λ1 is lower than the threshold in the node equipment F. Accordingly, when the node equipment F drops the wavelength λ1 from the input WDM optical signal and guides the dropped signal to the OUPSR unit 31, the OUPSR unit 31 determines that the optical signal λ1 is in the LOL state. Then, the OUPSR unit 31 performs path switching by using the optical switch 31a as described earlier with reference to FIG. 4. Consequently, the data transmission is recovered.

As described above, according to the first embodiment, a node (namely, the node equipment E) immediately adjacent to a drop node (namely, the node equipment F) of an optical signal that has entered the LOL state shuts off the optical output of the wavelength channel corresponding to the failed optical signal. As a result, ASE noise of the wavelength channel corresponding to the failed optical signal is suppressed, and the optical power of the wavelength channel becomes lower than the threshold for detecting the LOL state of an optical signal. Therefore, the OUPSR unit 31 of the client equipment 30 can suitably detect an LOL failure of an optical signal, whereby path switching can be performed to recover a data transmission.

Figure 8:
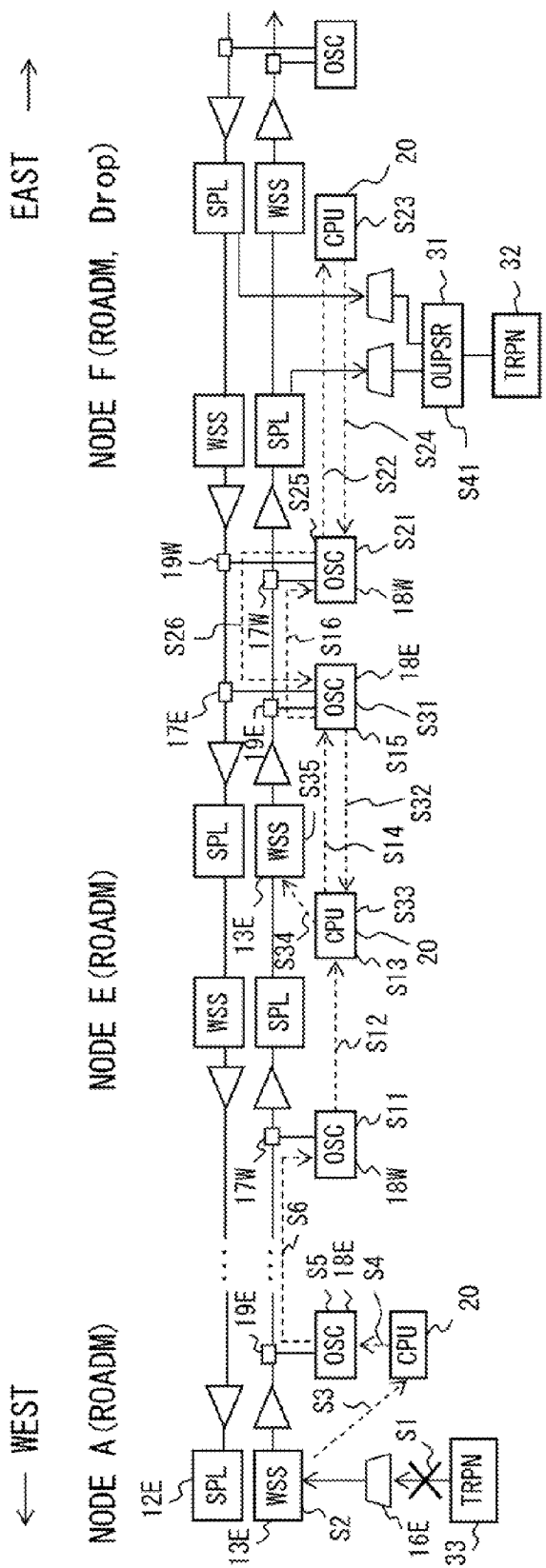
FIG. 8 is an explanatory view of shutoff operation according to the first embodiment.

FIG. 8 is an explanatory view of shutoff operation according to the first embodiment. Here, assume that shutoff operation is performed due to the failure illustrated in FIG. 2. Namely, when the WDM transmission system 1 is normally operating, the optical signal (hereinafter referred to as the optical signal X1) that carries data of the client X accommodated by the node equipment A is transmitted via the node equipments B, C, D and E, and guided to the transponder 32 by the node equipment F. When the node equipment A has detected a failure of the optical signal X1, the node equipment E shuts off the wavelength corresponding to the optical signal X1. In FIG. 8, components that do not directly relate to the shutoff operation are omitted. Also in subsequent drawings similar to FIG. 8, components that do not directly relate to the shutoff operation are omitted.

S1: The optical signal X1 output from the transponder 33 has entered the LOL (Loss of Light) state in the node equipment A. Here, assume that the wavelength of the optical signal X1 is λ1.

S2: The wavelength selective switch 13E detects the LOL state of the wavelength λ1. The wavelength selective switch 13E monitors optical power of each wavelength, for example, by using an OCM. When the optical power of a certain wavelength is lower than a specified threshold, light having that wavelength is decided to be in the LOL state.

S3: The wavelength selective switch 13E notifies the CPU 20 that the wavelength λ1 is in the LOL state.

S4: The CPU 20 issues to the OSC controller 18E an instruction to set the λ1 bit of the WCF signal to "1:failure".

S5: The OSC controller 18E sets the λ1 bit of the WCF signal to "1:failure" according to the instruction issued from the CPU 20. Then, the OSC controller 18E generates an OSC signal including the WCF signal.

S6: The OSC signal output from the OSC controller 18E is added to a WDM optical signal by the OSC coupler 19E. Accordingly, this OSC signal is transmitted to the next node equipment (namely, the node equipment B).

Operations performed upon receipt of the above described OSC signal are substantially the same in the node equipments B to E. Therefore, operations of the node equipment E that has received the OSC signal are described below.

S11: The OSC filter 17W of the node equipment E extracts the OSC signal from the input WDM optical signal, and guides the extracted signal to the OSC controller 18W. Namely, the OSC controller 18W receives the OSC signal generated by the node equipment D.

S12: The OSC controller 18W extracts the WCF signal from the received OSC signal. Then, the OSC controller 18W transmits the extracted WCF signal to the CPU 20.

S13: The CPU 20 recognizes that the λ1 bit of the WCF signal is "1". Then, the CPU 20 checks whether or not the local node (namely, the node equipment E) terminates the optical signal having the wavelength λ1. In this example, the optical signal having the wavelength λ1 is dropped by the node equipment F. Namely, the optical signal having the wavelength λ1 is not terminated by the node equipment E.

S14: When the optical signal having the wavelength λ1 is not terminated by the node equipment E, the CPU 20 issues to the OSC controller 18E an instruction to set the λ1 bit of the WCF signal to "1:failure".

S15: The OSC controller 18E sets the λ1 bit of the WCF signal to "1:failure" according to the instruction issued from the CPU 20. Then, the OSC controller 18E generates an OSC signal including the WCF signal.

S16: The OSC signal output from the OSC controller 18E is added to a WDM optical signal by the OSC coupler 19E. Accordingly, this OSC signal is transmitted to the next node equipment (namely, the node equipment F).

As described above, upon receipt of the WCF signal where the $\lambda 1$ bit is "1" from the node equipment at the preceding node, each of the node equipments B, C, D and E transmits the WCF signal where the $\lambda 1$ bit is "1" to the node equipment at the succeeding node. Namely, node equipments B, C, D and E relay the WCF signal where the $\lambda 1$ bit is "1" from the node equipment A to the node equipment F.

S21: The OSC filter 17W of the node equipment F extracts the OSC signal from the input WDM optical signal, and guides the extracted signal to the OSC controller 18W. Namely, the OSC controller 18W receives the OSC signal generated by the node equipment E.

S22: The OSC controller 18W extracts the WCF signal from the received OSC signal. Then, the OSC controller 18W transmits the extracted WCF signal to the CPU 20.

S23: The CPU 20 recognizes that the $\lambda 1$ bit of the WCF signal is "1". Then, the CPU 20 checks whether or not the local node (namely, the node equipment F) terminates the optical signal having the wavelength $\lambda 1$. In this example, the optical signal having the wavelength $\lambda 1$ is dropped by the node equipment F. Namely, the optical signal having the wavelength $\lambda 1$ is terminated by the node equipment F.

S24: When the optical signal having the wavelength $\lambda 1$ is terminated by the node equipment F, the CPU 20 issues to the OSC controller 18W an instruction to set the $\lambda 1$ bit of the shutoff signal to "1:perform shutoff".

S25: The OSC controller 18W sets the $\lambda 1$ bit of the shutoff signal to "1:perform shutoff" according to the instruction issued from the CPU 20. Then, the OSC controller 18W generates an OSC signal including this shutoff signal.

S26: The OSC signal output from the OSC controller 18W is added to a WDM optical signal by the OSC coupler 19W. Accordingly, this OSC signal is transmitted to the node equipment (namely, the node equipment E) on the upstream side of the equipment F on the transmission route of the optical signal X1.

S31: In the node equipment E, the OSC filter 17E extracts the OSC signal from the input WDM optical signal, and guides the extracted signal to the OSC controller 18E. Namely, the OSC controller 18E receives the OSC signal generated by the node equipment F.

S32: The OSC controller 18E extracts the shutoff signal from the received OSC signal. Then, the OSC controller 18E transmits the extracted shutoff signal to the CPU 20.

S33: The CPU 20 detects that the $\lambda 1$ bit of the shutoff signal is "1:perform shutoff". Then, the CPU 20 checks the $\lambda 1$ bit of the WCF signal received earlier.

S34: The CPU 20 determines whether or not the WCF signal and the shutoff signal satisfy the control condition illustrated in FIG. 6. In this embodiment, the WCF signal detected in S13 is "1", and the shutoff signal detected in S33 is "1". Namely, the shutoff condition is satisfied. Accordingly, the CPU 20 issues to the wavelength selective switch 13E an instruction to shut off the optical output of the wavelength $\lambda 1$.

S35: The wavelength selective switch 13E shuts off the optical output of the wavelength $\lambda 1$ according to the instruction issued from the CPU 20.

S41: The optical power of the wavelength $\lambda 1$ is sufficiently low in the node equipment F because the wavelength $\lambda 1$ has been shut off in the node equipment E. At this time, the $\lambda 1$ component of ASE noise is also sufficiently suppressed. Accordingly, the OUPSR unit 31 of the client equipment 30 accommodated by the node equipment F detects the LOL state of the wavelength channel $\lambda 1$ (namely, the optical signal X1) on the WEST route. Then, the OUPSR unit 31 selects a corresponding optical signal on the EAST route in order to switch the path of the data transmission.

As described above, in the first embodiment, the node equipment (node equipment E) that firstly receives the shutoff signal from the drop node equipment (node equipment F) shuts off the optical output of the wavelength corresponding to the optical signal X1. In other words, upon receipt of the failure signal that represents the failure of the wavelength $\lambda 1$, the drop node equipment (node equipment F) of the wavelength $\lambda 1$ issues, to the node equipment (node equipment E) at the preceding stage, an instruction to shut off the optical output of the wavelength $\lambda 1$. As a result, the ASE noise component of the wavelength $\lambda 1$ is sufficiently suppressed.

FIG. 9 is an explanatory view of shutoff cancellation operation according to the first embodiment. Here, assume that the failure illustrated in FIG. 8 has been recovered. Then, the shutoff operation being performed in the node equipment E is canceled.

S1: In the node equipment A, the optical signal X1 output from the transponder 33 is recovered. Here, assume that the wavelength of the optical signal X1 is $\lambda 1$.

S2: The wavelength selective switch 13E detects that the optical signal having the wavelength $\lambda 1$ has been recovered from the LOL state. The wavelength selective switch 13E monitors the optical power of each wavelength, for example, by using an OCM. When the optical power of a certain wavelength becomes higher than a threshold, the optical signal having that wavelength is determined to have been recovered.

S3: The wavelength selective switch 13E notifies the CPU 20 that the wavelength $\lambda 1$ has been recovered. Note that a notification of recovery includes ceasing a notification of failure.

S4: The CPU 20 issues to the OSC controller 18E an instruction to set the $\lambda 1$ bit of the WCF signal to "0:OK".

S5: The OSC controller 18E sets the $\lambda 1$ bit of the WCF signal to "0:OK" according to the instruction issued from the CPU 20. Then, the OSC controller 18E generates an OSC signal including the WCF signal.

S6: The OSC signal output from the OSC controller 18E is added to a WDM optical signal by the OSC coupler 19E. Accordingly, this OSC signal is transmitted to the next node equipment (namely, the node equipment B).

Operations performed upon receipt of the above described OSC signal are substantially the same in the node equipments B to E. Accordingly, operations of the node equipment E that has received the OSC signal are described below.

S11: The OSC filter 17W of the node equipment E extracts the OSC signal from the input WDC optical signal, and guides the extracted signal to the OSC controller 18W. Namely, the OSC controller 18W receives the OSC signal generated by the node equipment D.

S12: The OSC controller 18W extracts the WCF signal from the received OSC signal. Then, the OSC controller 18W transmits the extracted WCF signal to the CPU 20.

S13: The CPU 20 checks contents of the WCF signal. The CPU 20 also checks the shutoff signal received earlier.

S14: The CPU 20 checks whether or not the WCF signal and the shutoff signal satisfy the control condition illustrated in FIG. 6. In this example, the new WCF signal is "0" and the shutoff signal received from the node equipment F in FIG. 8 is "1" for the wavelength $\lambda 1$. Namely, the shutoff cancellation condition is satisfied. Accordingly, the CPU 20 issues to the wavelength selective switch 13E an instruction to cancel the shutoff of the optical output of the wavelength $\lambda 1$.

S15: The wavelength selective switch 13E cancels the shutoff of the optical output of the wavelength λ1 according to the instruction issued from the CPU 20. As a result, the wavelength selective switch 13E outputs the light of the wavelength λ1 along with lights of other wavelengths without shutting off the light of the wavelength λ1.

S16: The CPU 20 checks whether or not the local node (namely, the node equipment E) terminates the optical signal having the wavelength λ1. In this example, the node equipment E does not terminate the optical signal having the wavelength λ1. Then, the CPU 20 issues to the OSC controller 18E an instruction to set the λ1 bit of the WCF signal to "0:OK".

S17: The OSC controller 18E sets the λ1 bit of the WCF signal to "0:OK" according to the instruction issued from the CPU 20. Then, the OSC controller 18E generates an OSC signal including the WCF signal.

S18: The OSC signal output from the OSC controller 18E is added to a WDM optical signal by the OSC coupler 19E. Accordingly, this OSC signal is transmitted to the next node equipment (namely, the node equipment F).

S21: The OSC filter 17W of the node equipment F extracts the OSC signal from the input WDC optical signal, and guides the extracted signal to the OSC controller 18W. Namely, the OSC controller 18W receives the OSC signal generated by the node equipment E.

S22: The OSC controller 18W extracts the WCF signal from the received OSC signal. Then, the OSC controller 18W transmits the extracted WCF signal to the CPU 20.

S23: The CPU 20 recognizes that the λ1 bit of the WCF signal is "0". Then, the CPU 20 checks whether or not the local node (namely, the node equipment F) terminates the optical signal having the wavelength λ1. In this example, the optical signal having the wavelength λ1 is terminated by the node equipment F.

S24: When the node equipment F terminates the optical signal having the wavelength λ1, the CPU 20 issues to the OSC controller 18W an instruction to set the λ1 bit of the shutoff signal to "0:non-shutoff".

S25: The OSC controller 18W sets the λ1 bit of the shutoff signal to "0:non-shutoff" according to the instruction issued from the CPU 20. Then, the OSC controller 18W generates an OSC signal including the shutoff signal.

S26: The OSC signal output from the OSC controller 18W is added to a WDM optical signal by the OSC coupler 19W. Accordingly, this OSC signal is transmitted to the node equipment (namely, the node equipment E) on the upstream side of the node equipment F on the transmission route of the optical signal X1. The node equipment E extracts the shutoff signal from the received OSC signal, and recognizes contents of the shutoff signal.

S27: The OUPSR unit 31 of the client equipment 30 accommodated by the node equipment F receives the optical signal X1. Since then, the OUPSR unit 31 receives the optical signal X1 via the WEST route and the optical signal X2 via the EAST route. However, the OUPSR unit 31 does not necessarily switch a path for the wavelength channel of λ1 when the optical signal X1 is recovered.

Second Embodiment

In the first embodiment, the drop node equipment transmits the shutoff signal upon recognizing that a failure has occurred based on a WCF signal. In contrast, in the second embodiment, the drop node equipment periodically transmits a shutoff signal regardless of a WCF signal.

Figure 10:
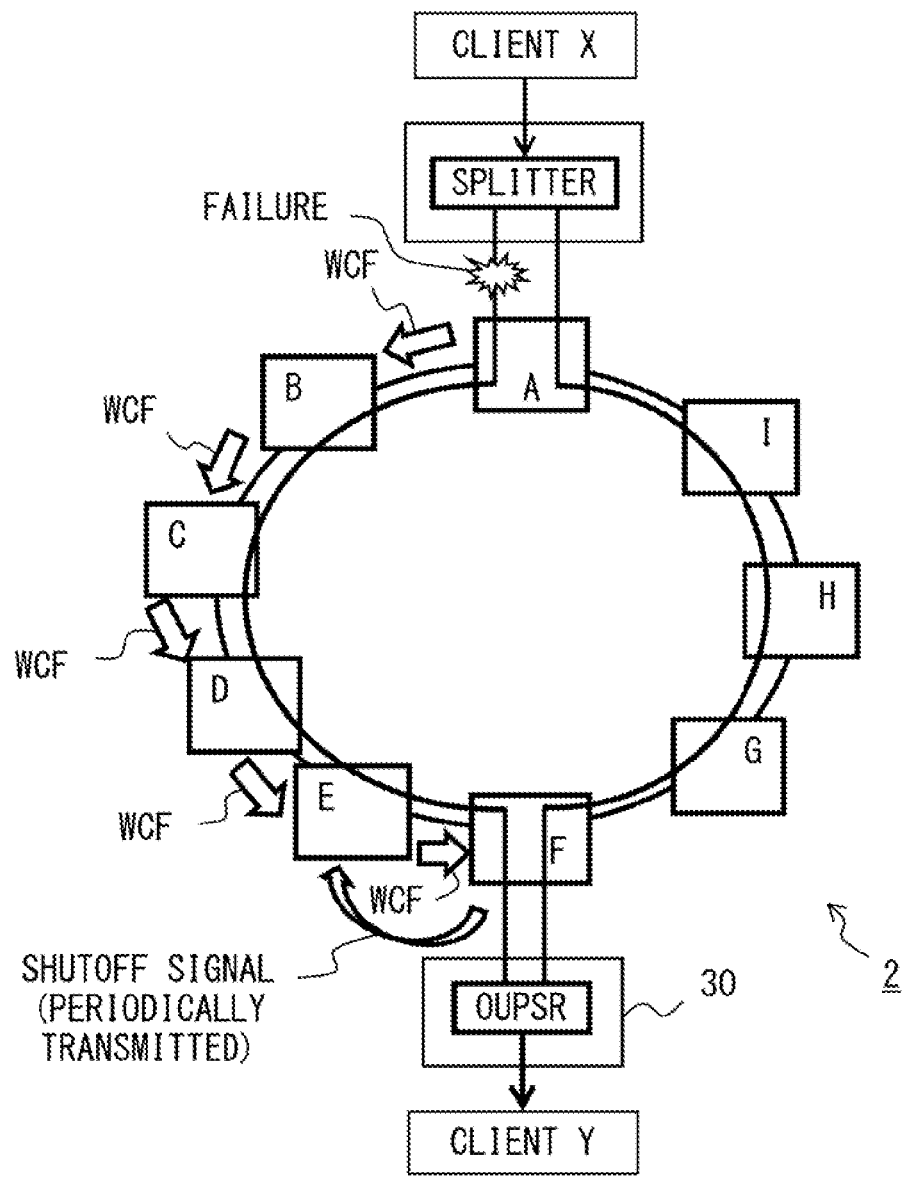
FIG. 10 is an explanatory view of an outline of a second embodiment.

FIG. 10 is an explanatory view of an outline of the second embodiment. In FIG. 10, a layout of node equipments A to I of a WDM transmission system 2 according to the second embodiment is substantially the same as that of the first embodiment.

In FIG. 10, the drop node equipment (namely, the node equipment F) of the optical signal X1 periodically (or constantly) generates and transmits a shutoff signal regardless of whether or not a failure has occurred. Here, the node equipment F periodically transmits a shutoff signal that specifies the optical signal X1 after a network management system has set a wavelength channel for the optical signal X1. This shutoff signal is transmitted in a reverse direction on the transmission route of the optical signal X1 by using an OSC frame. Accordingly, this shutoff signal is transmitted to the node equipment E. Namely, the node equipment E periodically receives the shutoff signal that specifies the optical signal X1.

Assume that the node equipment A detects a failure of the optical signal X1 in the WDM transmission system 2. Then, the node equipment A transmits to the node equipment B a WCF signal that specifies the optical signal X1 in a similar manner as in the first embodiment. This WCF signal is sequentially relayed by the node equipments B, C, D and E in a similar manner as in the first embodiment.

The node equipment E receives the above described WCF signal. Here, the node equipment E has received the shutoff signal that specifies the optical signal X1. Accordingly, the node equipment E instantaneously shuts off the optical output of the wavelength corresponding to the optical signal X1 upon receipt of the above described WCF signal. As a result, ASE noise of the wavelength corresponding to the optical signal X1 is suppressed. Therefore, also in the second embodiment, the LOL (Loss of Light) state of the optical signal X1 can be securely detected in the client equipment 30 accommodated by the node equipment F in a similar manner as in the first embodiment. Moreover, according to the second embodiment, the period of time needed from an occurrence of the failure until the shutoff operation is performed becomes short in comparison with that in the first embodiment.

Each of the node equipments performs or cancels the shutoff operation according to the control condition illustrated in FIG. 6. However, the node equipment immediately preceding the drop node equipment periodically receives the shutoff signal as described above. Accordingly, the shutoff is performed or canceled in this node equipment substantially based on only a WCF signal.

Figure 11:
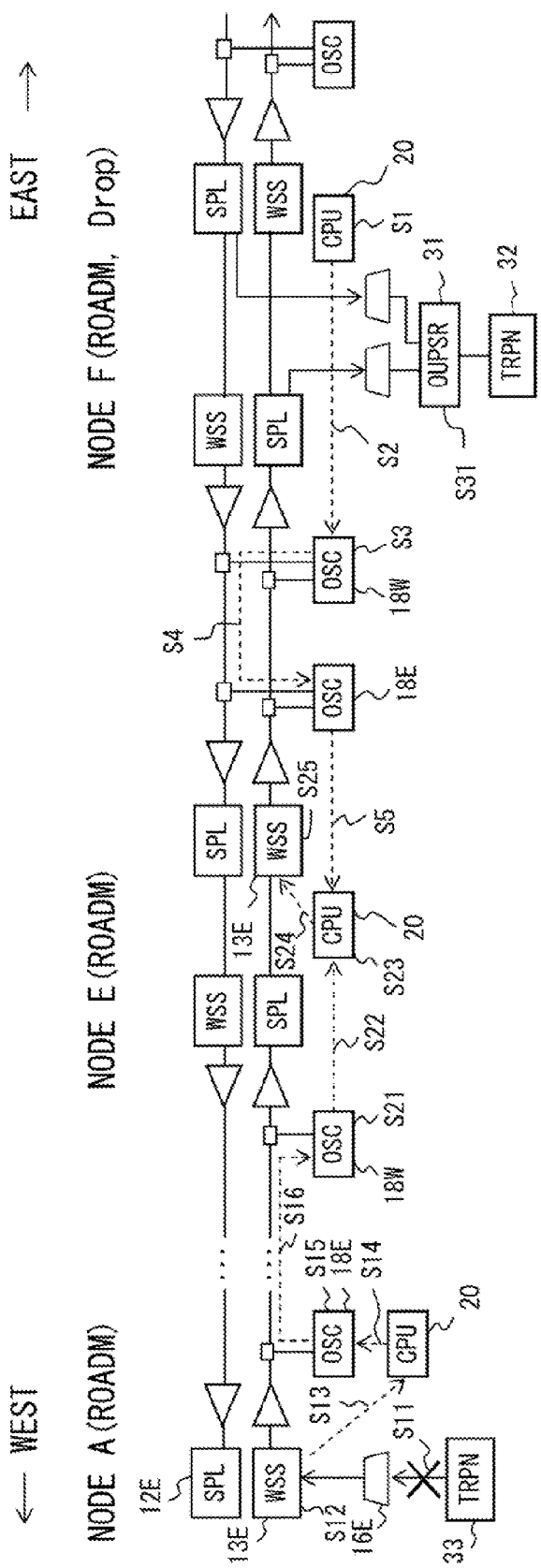
FIG. 11 is an explanatory view of shutoff operation according to the second embodiment.

FIG. 11 is an explanatory view of shutoff operation according to the second embodiment. Here, assume that shutoff is performed due to the failure illustrated in FIG. 10.

S1: The CPU 20 of the node equipment F recognizes a wavelength to be terminated (namely, dropped) by the node equipment F in the WDM optical signal received from the WEST route. In this example, the node equipment F terminates the optical signal X1 (namely, the wavelength λ1). A wavelength terminated by each of the node equipments is specified, for example, by the network management system.

S2: The CPU 20 issues to the OSC controller 18W an instruction to generate a shutoff signal that specifies the wavelength λ1.

S3: The OSC controller 18W sets the λ1 bit of the shutoff signal to "1:perform shutoff" according to the instruction issued from the CPU 20. Then, the OSC controller 18W generates an OSC signal including this shutoff signal.

S4: The OSC signal output from the OSC controller 18W is added to a WDM optical signal, and transmitted to the node equipment E.

S5: In the node equipment E, the OSC controller 18E receives the OSC signal generated by the node equipment F.

The OSC controller 18E extracts the shutoff signal from the received OSC signal. Then, the OSC controller 18E transmits the extracted shutoff signal to the CPU 20. S1 to S5 are performed, for example, periodically. Accordingly, in this case, the above described shutoff signal is periodically transmitted from the node equipment F to the node equipment E.

S11 to S16: The node equipment A detects a failure of the wavelength $\lambda1$. Then, the node equipment A transmits to the node equipment B an OSC signal including a WCF signal where the $\lambda1$ bit is set to "1". Since these operations are substantially the same as S1 to S6 illustrated in FIG. 8, explanations of these operations are omitted.

Operations performed upon receipt of the above described OSC signal are substantially the same in the node equipments B to E. Accordingly, operations of the node equipment E that has received the OSC signal are described below.

S21: In the node equipment E, the OSC controller 18W receives the OSC signal generated by the node equipment D.

S22: The OSC controller 18W extracts the WCF signal from the received OSC signal. Then, the OSC controller 18W transmits the extracted WCF signal to the CPU 20.

S23: The CPU 20 checks the WCF signal received from the node equipment D. At this time, the $\lambda1$ bit of the WCF signal is set to "1:failure".

S24: The CPU 20 periodically receives from the node equipment F the shutoff signal where the $\lambda1$ bit is set to "1:perform shutoff". Namely, the CPU 20 can determine whether or not to perform shutoff substantially based on only the WCF signal. Accordingly, the CPU 20 instantaneously issues to the wavelength selective switch 13E an instruction to shut off the optical output of the wavelength $\lambda1$ upon receipt of the WCF signal where the $\lambda1$ bit is "1".

S25: The wavelength selective switch 13E shuts off the optical output of the wavelength $\lambda1$ according to the instruction issued from the CPU 20.

S31: As a result of the shutoff performed in S25, the optical power of the wavelength $\lambda1$ is sufficiently small in the node equipment F. At this time, also an ASE noise component of the wavelength $\lambda1$ is sufficiently suppressed. Accordingly, the OUPSR unit 31 of client equipment accommodated by the node equipment F detects the LOL state of the wavelength channel $\lambda1$ (namely, the optical signal X1) on the WEST route.

Figure 12:
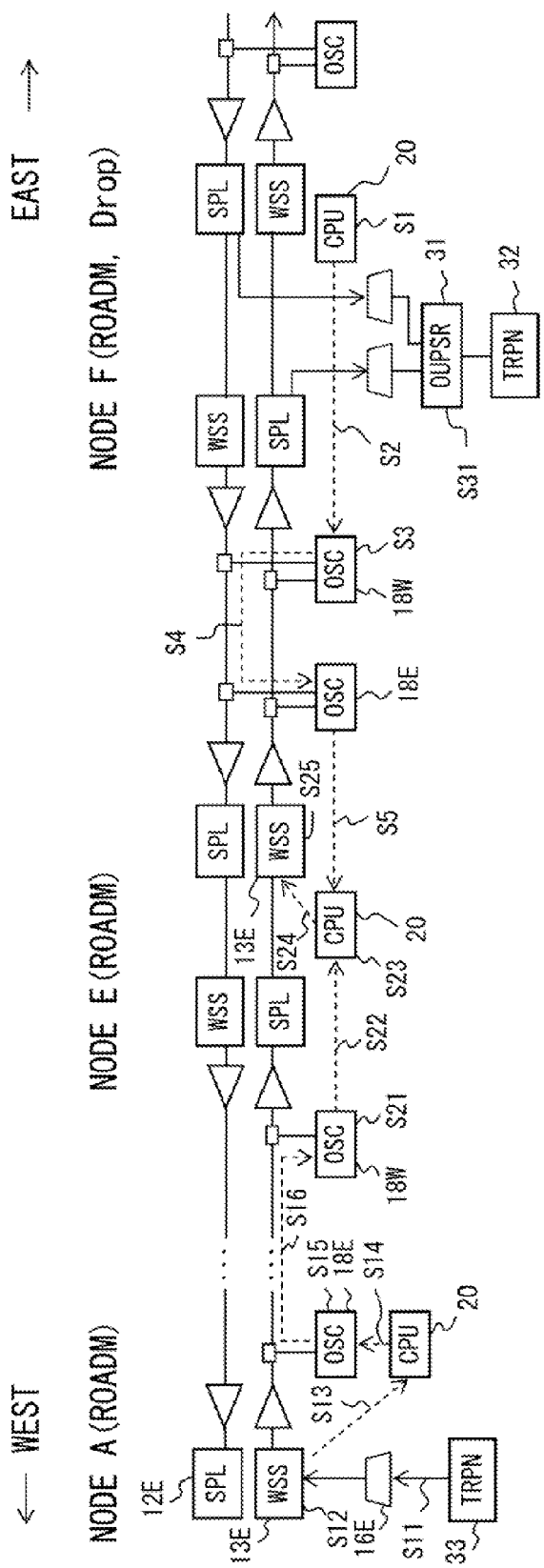
FIG. 12 is an explanatory view of shutoff cancellation operation according to the second embodiment.

FIG. 12 is an explanatory view of shutoff cancellation operation according to the second embodiment. Here, assume that the failure illustrated in FIG. 11 has been recovered. Then, the shutoff operation being performed in the node equipment E is canceled.

S1 to S5: These operations are substantially the same as S1 to S5 illustrated in FIG. 11. Namely, the node equipment F periodically transmits a shutoff signal where the $\lambda1$ bit is set to "1:perform shutoff".

S11 to S16: In the node equipment A, the failure of the optical signal having the wavelength $\lambda1$ has been recovered. As a result, this optical signal is transmitted up to the node equipment E. At this time point, the node equipment E shuts off the optical output of the wavelength $\lambda1$. Moreover, the node equipment A transmits to the node equipment B an OSC signal including a WCF signal where the $\lambda1$ bit is set to "0:OK". This WCF signal is sequentially relayed by the node equipments B, C and D, and transmitted up to the node equipment E. Since these operations are substantially the same as S1 to S6 illustrated in FIG. 9, explanations of these operations are omitted.

S21: In the node equipment E, the OSC controller 18W receives the OSC signal generated by the node equipment D.

S22: The OSC controller 18W extracts the WCF signal from the received OSC signal. Then, the OSC controller 18W transmits the extracted WCF signal to the CPU 20.

S23: The CPU 20 checks the WCF signal received from the node equipment D. At this time, the $\lambda1$ bit of the WCF signal is set to "0:OK".

S24: The CPU 20 periodically receives from the node equipment F the shutoff signal where the $\lambda1$ bit is set to "1:perform shutoff". Namely, the CPU 20 determines whether or not to cancel the shutoff substantially based on only the WCF signal. Accordingly, the CPU 20 instantaneously issues to the wavelength selective switch 13E an instruction to cancel the shutoff of the wavelength $\lambda1$ upon receipt of the WCF where the $\lambda1$ bit is set to "0".

S25: The wavelength selective switch 13E cancels the shutoff of the optical output of the wavelength $\lambda1$ according to the instruction issued from the CPU 20. The optical signal X1 is transmitted up to the node equipment F without being shut off in the node equipment E.

S31: The OUPSR unit 31 of the client equipment 30 accommodated by the node equipment F receives the optical signal X1.

Third Embodiment

In the first and the second embodiments, the ROADM (node equipment E) is provided immediately adjacent to the drop node (node equipment F) of the optical signal X1. In contrast, in the third embodiment, an ILA (In-Line Amplifier) is provided immediately adjacent to the drop node (node equipment F) of the optical signal X1.

Figure 13:
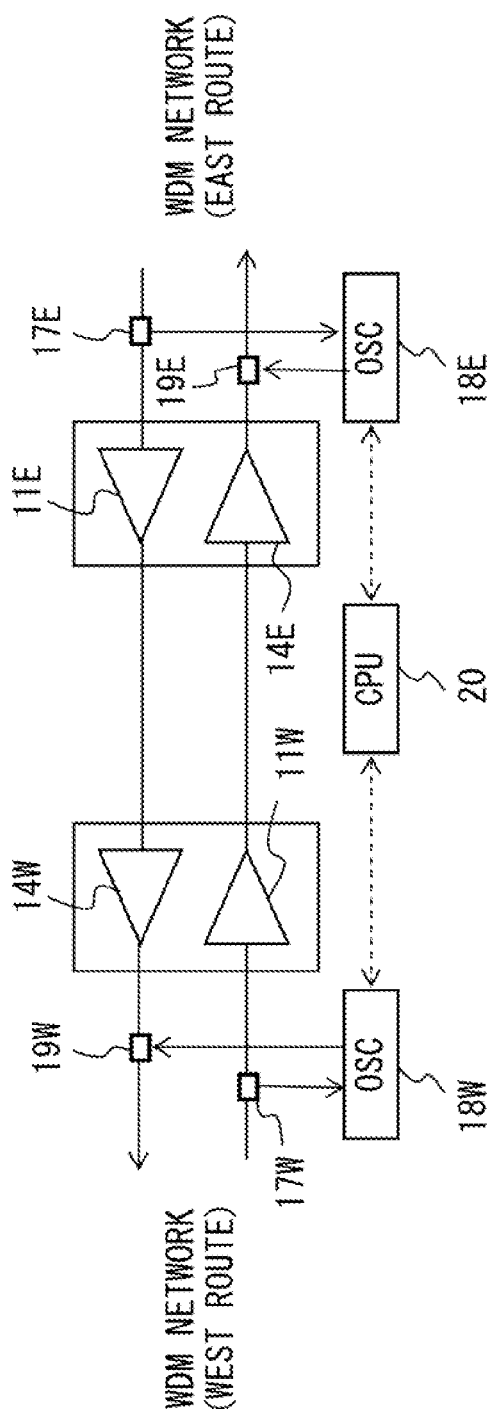
FIG. 13 illustrates a configuration of an ILA.

FIG. 13 illustrates a configuration of the ILA. The ILA includes optical amplifiers 11W, 11E, 14W and 14E, OSC filters 17W and 17E, OSC controllers 18W and 18E, OSC couplers 19W and 19E, and the CPU 20. These components are similar to corresponding components provided in the ROADM illustrated in FIG. 3. Namely, a function of amplifying a WDM optical signal is substantially the same in the ILA and the ROADM.

However, the ILA has neither the function of dropping a specified wavelength channel from a WDM optical signal nor the function of adding a desired wavelength channel to a WDM optical signal. Namely, the ILA does not have the function of controlling an optical signal for each wavelength. Accordingly, the ILA operates as amplifying node equipment for collectively amplifying a WDM optical signal.

FIG. 14 is an explanatory view of an outline of the third embodiment. A layout of node equipments in a WDM transmission system 3 according to the third embodiment is similar to that of the first embodiment. However, in the third embodiment, an ILA (node equipment E) is provided immediately adjacent to the drop node (node equipment F) of the optical signal X1. In FIG. 14, the ILA (node equipment E) is depicted with a dotted line frame.

Assume that the node equipment A detects a failure of the optical signal X1 in the above described WDM transmission system 3. Then, the node equipment A transmits to the node equipment B a WCF signal that specifies the optical signal X1 in a similar manner as in the first embodiment. This WCF signal is sequentially relayed by the node equipments B, C, D and E, and transmitted up to the node equipment F in a similar manner as in the first embodiment.

The node equipment F generates a shutoff signal that specifies the optical signal X1, and transmits the generated shutoff signal to the node equipment E in a similar manner as in the first embodiment. However, the node equipment E is the ILA, and cannot control an optical signal for each wavelength.

Accordingly, the node equipment E transfers the shutoff signal to an upstream side. As a result, the node equipment D receives the shutoff signal that specifies the optical signal X1.

Operations of the node equipment D that has received the shutoff signal are substantially the same as those of the node equipment E in the first embodiment. Namely, the node equipment D determines whether or not the WCF signal and the shutoff signal satisfy the control condition illustrated in FIG. 6. In this example, the node equipment D receives the WCF signal that specifies the optical signal X1 from the node equipment C, and also receives the shutoff signal that specifies the optical signal X1 from the node equipment E. Accordingly, the node equipment D shuts off the optical output of the wavelength corresponding to the optical signal X1 by using the wavelength selective switch.

As a result of the above described shutoff, an ASE noise component of the wavelength corresponding to the optical signal X1 is suppressed. Accordingly, the client equipment 30 accommodated by the node equipment F can detect that the optical signal X1 is in the LOL state. Since the node equipment E is arranged between the node equipment D and the node equipment F, ASE noise is generated in the node equipment E. However, the ASE noise generated in the node equipment E is sufficiently small in comparison with ASE noise accumulated in the node equipments B, C, D and E. Therefore, the OUPSR unit 31 of the client equipment 30 can securely detect the LOL state of the optical signal X1.

Figure 15:
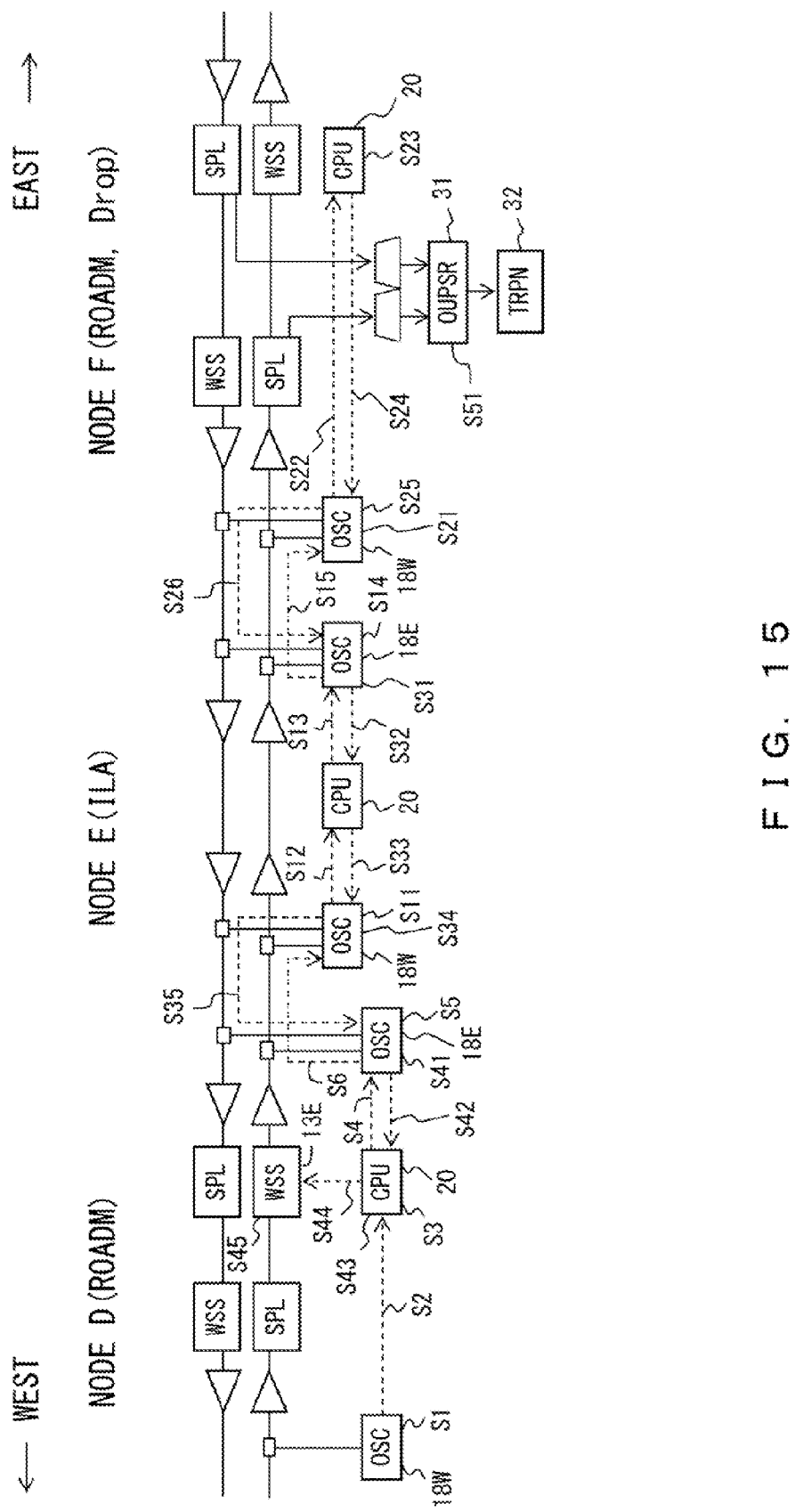
FIG. 15 is an explanatory view of shutoff operation according to the third embodiment.

FIG. 15 is an explanatory view of shutoff operation according to the third embodiment. Here, assume that shutoff is performed due to the failure illustrated in FIG. 14.

Upon detection of the failure of the optical signal X1, the node equipment A generates an OSC signal including a WCF signal where the λ1 bit is set to "1", and transmits the generated OSC signal to the node equipment B. This OSC signal is transmitted to the node equipment D via the node equipments B and C. Since these operations are substantially the same as those of the first embodiment illustrated in FIG. 8, explanations of these operations are omitted.

The node equipment D receives the above described OSC signal from the node equipment C. Operations (S1 to S6) of the node equipment D that has received the OSC signal are substantially the same as the operations (S11 to S16) of the node equipment E illustrated in FIG. 8. Accordingly, the node equipment D transmits to the node equipment E the OSC signal including the WCF signal where the λ1 bit is set to "1".

S11: The OSC controller 18W of the node equipment E receives the OSC signal generated by the node equipment D.

S12: The OSC controller 18W extracts the WCF signal from the received OSC signal. Then, the OSC controller 18W transmits the extracted WCF signal to the CPU 20.

S13: The CPU 20 recognizes that the λ1 bit of the WCF signal is "1:failure". Here, the node equipment E is not a ROADM but an ILA. Accordingly, the CPU 20 issues to the OSC controller 18E an instruction to set the λ1 bit of the WCF signal to "1:failure".

S14: The OSC controller 18E sets the λ1 bit of the WCF signal to "1" according to the instruction issued from the CPU 20. Then, the OSC controller 18E generates an OSC signal including the WCF signal.

S15: The OSC signal output from the OSC controller 18E is added to a WDM optical signal, and transmitted to the node equipment F.

Upon receipt of the above described OSC signal from the node equipment E, the node equipment F transmits to the node equipment E the OSC signal including the shutoff signal where the λ1 bit is set to "1:perform shutoff" in a similar manner as in the first embodiment illustrated in FIG. 8. S21 to S26 illustrated in FIG. 15 are substantially the same as S21 to S26 illustrated in FIG. 8.

S31: The OSC controller 18E of the node equipment E receives the OSC signal generated by the node equipment F.

S32: The OSC controller 18E extracts the shutoff signal from the received OSC signal, and transmits the extracted signal to the CPU 20.

S33: The CPU 20 recognizes that the λ1 bit of the received shutoff signal is "1". Then, the CPU 20 issues to the OSC controller 18W an instruction to set the λ1 bit of the shutoff signal to "1:perform shutoff".

S34: The OSC controller 18W sets the λ1 bit of the shutoff signal to "1" according to the instruction issued from the CPU 20. Then, the OSC controller 18W generates an OSC signal including the shutoff signal.

S35: The OSC signal output from the OSC controller 18W is added to a WDM optical signal, and transmitted to the node equipment D.

The node equipment D receives the above described OSC signal from the node equipment E. Operations (S41 to S45) of the node equipment D are substantially the same as the operations (S31 to S35) of the node equipment E illustrated in FIG. 8. Accordingly, the wavelength selective switch 13E shuts off the optical output of the wavelength λ1 in the node equipment D.

S51: As a result of the shutoff performed in the node equipment D, the optical power of the wavelength λ1 is sufficiently small in the node equipment F. Accordingly, the OUPSR unit 31 of the client equipment 30 accommodated by the node equipment F detects the LOL state of the wavelength channel λ1 (namely, the optical signal X1) on the WEST route.

Figure 16:
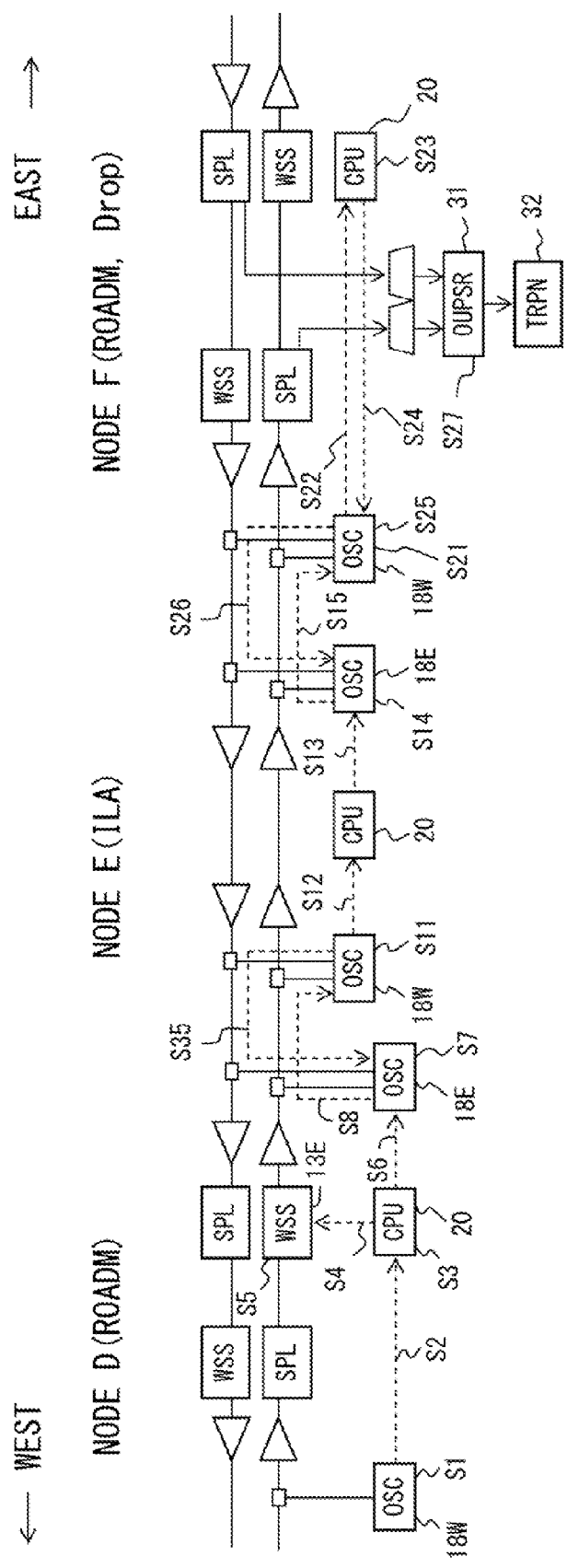
FIG. 16 is an explanatory view of shutoff cancellation operation according to the third embodiment.

FIG. 16 is an explanatory view of shutoff cancellation operation according to the third embodiment. Here, assume that the failure illustrated in FIG. 15 has been recovered. Then, the shutoff operation performed in the node equipment D is canceled.

The node equipment A transmits to the node equipment B an OSC signal including a WCF signal where the λ1 bit is set to "0:OK". Since this operation is substantially the same as that of the first embodiment illustrated in FIG. 9, an explanation of this operation is omitted.

The node equipment D receives the above described OSC signal. Operations (S1 to S8) of the node equipment D that has received the OSC signal are substantially the same as the operations (S11 to S18) of the node equipment E illustrated in FIG. 9. Namely, the wavelength selective switch 13E of the node equipment D cancels the shutoff of the optical output of the wavelength λ1. Moreover, the node equipment D transmits to the node equipment E the OSC signal including the WCF signal where the λ1 bit is set to "0:OK".

In S11 to S15, the node equipment E extracts the WCF signal from the received OSC signal and recognizes that the λ1 bit of the WCF signal is "0". Then, the node equipment E transmits to the node equipment F the OSC signal including the WCF signal where the λ1 bit is set to "0".

Operations (S21 to S27) of the node equipment F are substantially the same as those of the first embodiment illustrated in FIG. 9. Namely, the node equipment F transmits to the node equipment E the shutoff signal where the λ1 bit is set to "0:non-shutoff". Moreover, since the shutoff is canceled in the node equipment D, the node equipment F receives the optical signal X1 from the WEST route.

The node equipment E may newly generate a shutoff signal where the λ1 bit is set to "0" upon receipt of the shutoff signal where the λ1 bit is set to "0" from the node equipment F, and transmit the newly generated signal to the node equipment D, although this is not particularly illustrated.

Fourth Embodiment

In the fourth embodiment, an ILA is provided immediately adjacent to the drop node (node equipment F) of the optical signal X1 in a similar manner as in the third embodiment. Moreover, in the fourth embodiment, drop node equipment periodically transmits a shutoff signal that specifies the optical signal X1 in a similar manner as in the second embodiment.

FIG. 17 is an explanatory view of an outline of the fourth embodiment. A layout of node equipments of a WDM transmission system 4 according to the fourth embodiment is substantially the same as that of the third embodiment. Namely, an ILA (node equipment E) is provided immediately adjacent to the drop node (node equipment F) of the optical signal X1.

In FIG. 17, the drop node equipment (namely, the node equipment F) of the optical signal X1 periodically generates a shutoff signal that specifies the optical signal X1 regardless of whether or not a failure has occurred. This shutoff signal is transmitted in a reverse direction on the transmission route of the optical signal X1 by using an OSC frame. Accordingly, this shutoff signal is transmitted to the node equipment E.

The node equipment E is an ILA, and cannot control an optical signal for each wavelength. Accordingly, the node equipment E transfers to the node equipment D the shutoff signal that specifies the optical signal X1. In this way, the node equipment D periodically receives the shutoff signal that specifies the optical signal X1.

The node equipment A detects a failure of the optical signal X1. Then, the node equipment A transmits to the node equipment B a WCF signal that specifies the optical signal X1 in a similar manner as in the first to the third embodiments. This WCF signal is sequentially transmitted to the node equipments B, C and D.

The node equipment D receives the above described WCF signal that specifies the optical signal X1 from the node equipment C. Here, the node equipment D periodically receives the shutoff signal that specifies the optical signal X1. Accordingly, the node equipment D instantaneously shuts off the optical output of the wavelength corresponding to the optical signal X1 upon receipt of the above described WCF signal. As a result, an ASE noise component of the wavelength corresponding to the optical signal X1 is suppressed. Accordingly, also in the fourth embodiment, the LOL (Loss of Light) state of the optical signal X1 can be securely detected in the client equipment 30 accommodated by the node equipment F.

Figure 18:
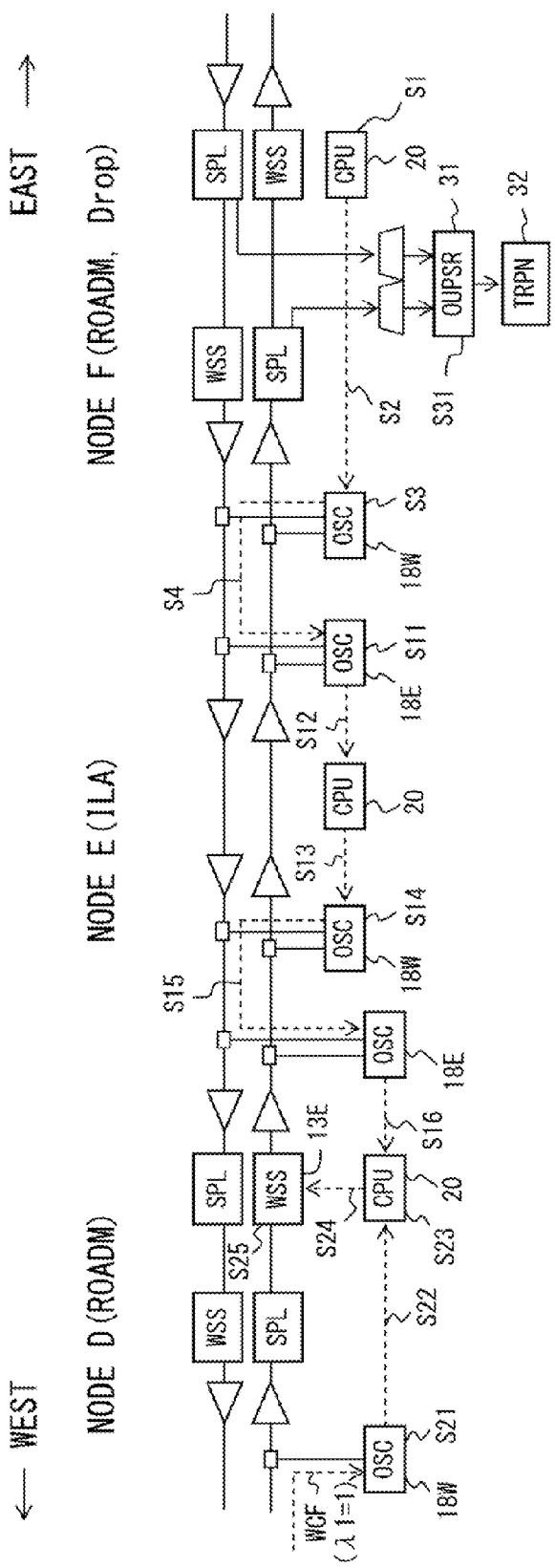
FIG. 18 is an explanatory view of shutoff operation according to the fourth embodiment.

FIG. 18 is an explanatory view of shutoff operation according to the fourth embodiment. Here, assume that shut off is performed due to the failure illustrated in FIG. 17.

In S1 to S4, the node equipment F periodically generates a shutoff signal where the λ1 bit is set to "1:perform shutoff", and transmits the shutoff signal to the node equipment E. These operations are substantially the same as those of the second embodiment illustrated in FIG. 11.

The node equipment E is an ILA, and cannot control an optical signal for each wavelength. Accordingly, the node equipment E transfers to the node equipment D the shutoff signal received from the node equipment F in S11 to S15.

S16: In the node equipment D, the OSC controller 18E extracts the shutoff signal from the received OSC signal. Then, the OSC controller 18E transmits the extracted shutoff signal to the CPU 20. Note that the node equipment D periodically receives the shutoff signal where the λ1 bit is set to "1:perform shutoff".

The node equipment A transmits to the node equipment B the OSC signal including the WCF signal where the λ1 bit is set to "1: failure" upon detection of the failure of the optical signal X1. This OSC signal is relayed by the node equipments B and C, and transmitted to the node equipment D. These operations are substantially the same as those of the first embodiment illustrated in FIG. 8.

S21 to S23: In the node equipment D, the OSC controller 18W extracts the WCF signal from the received OSC signal. Moreover, the OSC controller 18W transmits the extracted WCF signal to the CPU 20. Then, the CPU 20 recognizes that the λ1 bit of the WCF signal is set to "1:failure".

S24: The CPU 20 periodically receives from the node equipment E the shutoff signal where the λ1 bit is set to "1:perform shutoff". Namely, the CPU 20 can determine, based on the WCF signal, whether or not to perform shutoff operation. Accordingly, the CPU 20 instantaneously issues to the wavelength selective switch 13E an instruction to shut off the optical output of the wavelength λ1 upon receipt of the WCF signal where the λ1 bit is set to "1:failure".

S25: The wavelength selective switch 13E shuts off the optical output of the wavelength λ1 according to the instruction issued from the CPU 20.

S31: As a result of the shutoff performed in S25, the optical power of the wavelength λ1 is sufficiently small in the node equipment F. Accordingly, the OUPSR unit 31 detects the LOL state of the wavelength channel λ1 (namely, the optical signal X1) on the WEST route.

Figure 19:
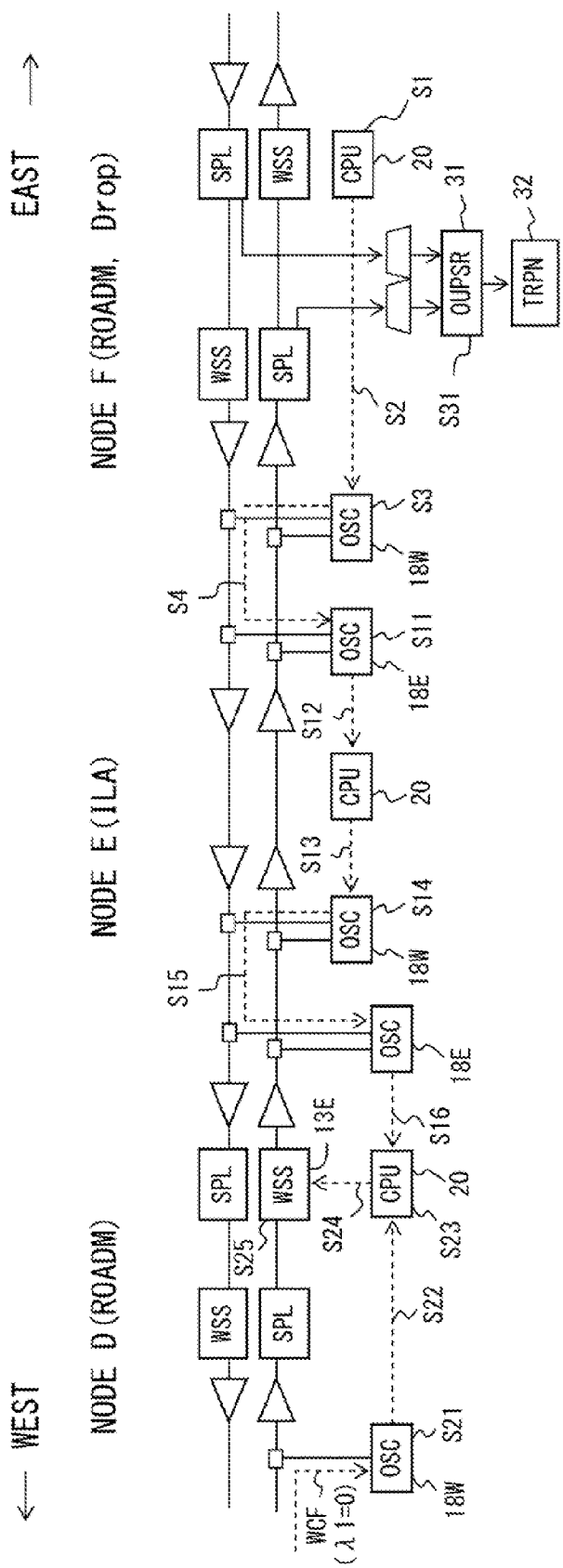
FIG. 19 is an explanatory view of shutoff cancellation operation according to the fourth embodiment.

FIG. 19 is an explanatory view of shutoff cancellation operation according to the fourth embodiment. Here, assume that the failure illustrated in FIG. 18 has been recovered.

A flow of a control signal of the shutoff cancellation operation is similar to that of operation used when the shutoff described with reference to FIG. 18 is performed. With the shutoff cancellation operation, however, a WCF signal where the λ1 bit is set to "0:OK" is transmitted from the node equipment A as illustrated in FIG. 19, and sequentially transferred to the node equipments B, C and D.

In S21 to S23, the node equipment D receives the WCF signal where the λ1 bit is set to "0:OK". Here, the CPU 20 periodically receives from the node equipment E the shutoff signal where the λ1 bit is set to "1:perform shutoff". Namely, the CPU 20 can determine, based on the WCF signal, whether or not to cancel the shutoff. Accordingly, upon receipt of the WCF signal where the λ1 bit is set to "0", the CPU 20 issues to the wavelength selective switch 13E an instruction to cancel the shutoff of the wavelength λ1 in S24. Then, the wavelength selective switch 13E cancels the shutoff of the optical output of the wavelength λ1 according to the instruction issued from the CPU 20 in S25. As a result, the optical signal X1 is transmitted up to the node equipment F without being shut off in the node equipment D. Therefore, in S31, the OUPSR unit 31 receives the optical signal X1.

Fifth Embodiment

In the first to the fourth embodiments, shutoff operation is performed in one certain node. In contrast, in the fifth embodiment, shutoff is performed in each node equipment on a transmission route between node equipment that has detected a failure and drop node equipment.

Figure 20:
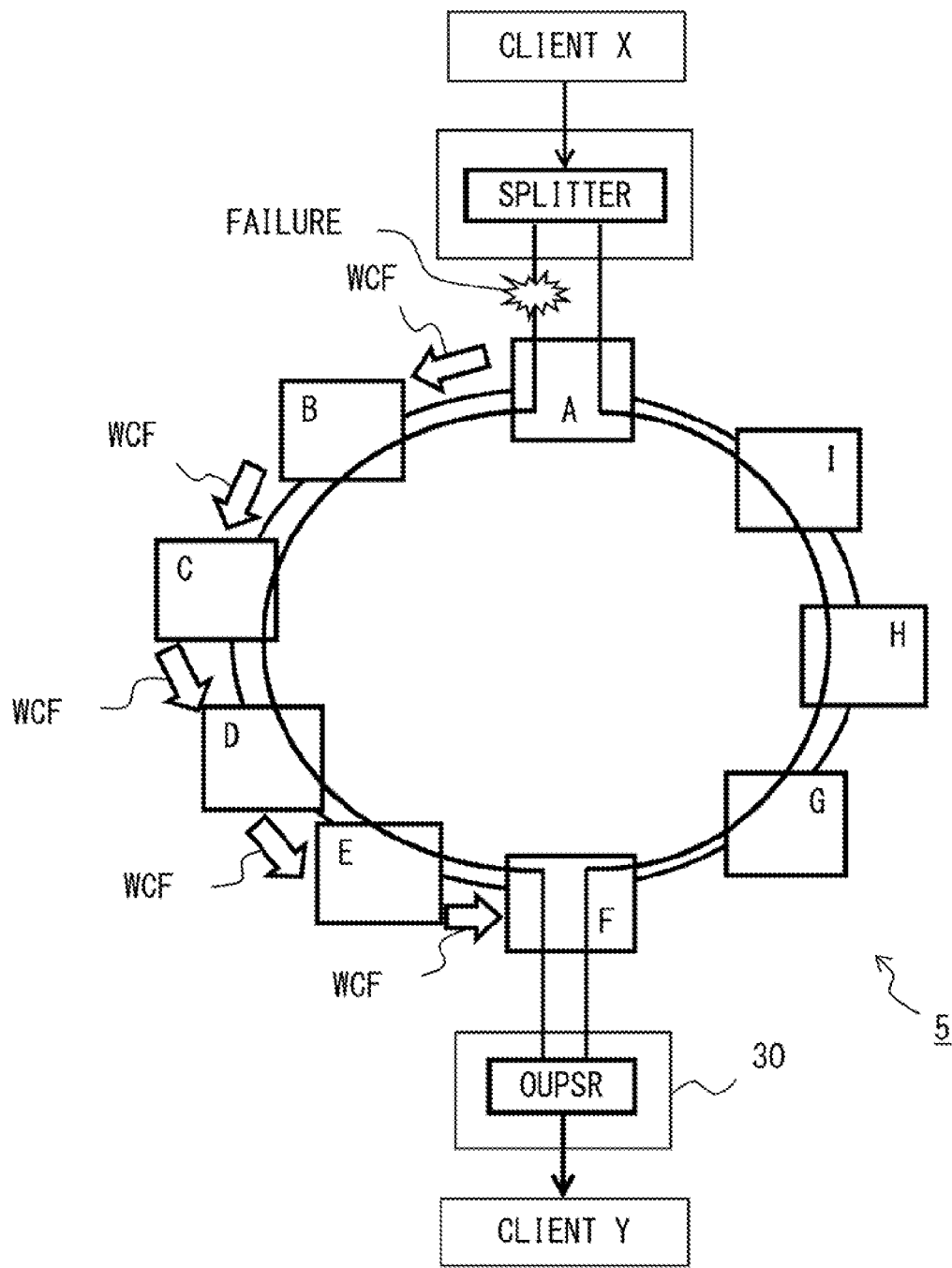
FIG. 20 is an explanatory view of an outline of a fifth embodiment.

FIG. 20 is an explanatory view of an outline of the fifth embodiment. A layout of node equipments A to I in a WDM transmission system 5 according to the fifth embodiment is substantially the same as that of the first embodiment. However, the WDM transmission system 5 according to the fifth embodiment does not use a shutoff signal.

Assume that the optical signal X1 has entered the LOL state and the node equipment A detects the failure in the WDM transmission system 5. In this case, the node equipment A generates a WCF signal that specifies the optical signal X1, and transmits the generated signal to the node equipment B in a similar manner as in the first to the fourth embodiments. Then, this WCF signal is sequentially relayed by the node equipments B, C, D and E, and transmitted up to the node equipment F.

Each of the node equipments determines, based on the WCF signal, whether either to execute or to cancel the shutoff for each wavelength. Accordingly, each of the node equipments B, C, D and E shuts off the optical output of the wavelength corresponding to the optical signal X1 upon receipt of the WCF signal that specifies the optical signal X1. As a result, an ASE noise component of the wavelength corresponding to the optical signal X1 is suppressed, and the OUPSR unit accommodated by the drop node equipment (that is, node equipment F) can securely detect the LOL state of the optical signal X1.

Figure 21:
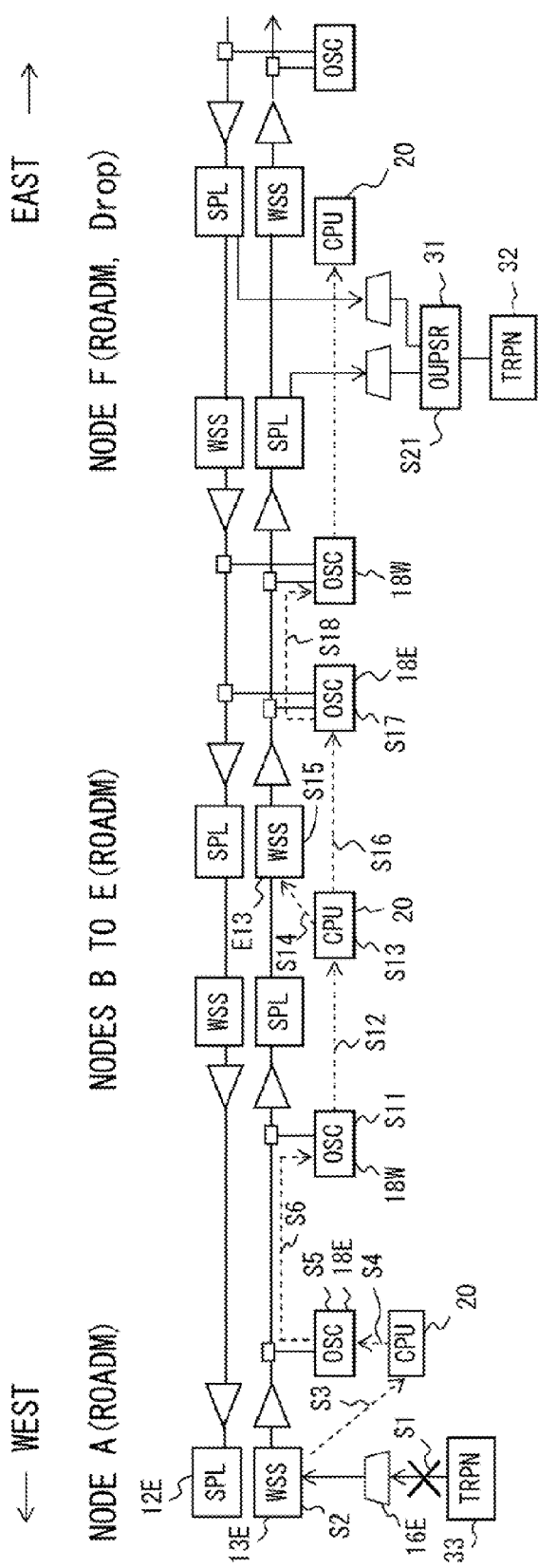
FIG. 21 is an explanatory view of shutoff operation according to the fifth embodiment.

FIG. 21 is an explanatory view of shutoff operation according to the fifth embodiment. Here, shutoff is performed due to the failure illustrated in FIG. 20.

The node equipment A transmits to the node equipment B an OSC signal including the WCF signal where the $\lambda 1$ bit is set to "1: failure" upon detection of the failure of the optical signal X1. Since this operation is substantially the same as that of the first embodiment illustrated in FIG. 8, an explanation of this operation is omitted.

The WCF signal transmitted from the node equipment A is sequentially relayed by the node equipments B, C, D and E, and transmitted up to the node equipment F. At this time, operations of the node equipments B, C, D and E are mutually substantially the same. Accordingly, the operation of the node equipment B is described below.

S11: The OSC controller 18W of the node equipment B receives the OSC signal generated by the node equipment A.

S12: The OSC controller 18W extracts the WCF signal from the received OSC signal. Then, the OSC controller 18W transmits the extracted WCF signal to the CPU 20.

S13: The CPU 20 recognizes that the $\lambda 1$ bit of the WCF signal is "1:failure". Moreover, the CPU 20 checks whether or not the local node (namely, the node equipment B) terminates the optical signal having the wavelength $\lambda 1$. In this example, the optical signal having the wavelength $\lambda 1$ is dropped by the node equipment F. Namely, the node equipment B does not terminate the optical signal having the wavelength $\lambda 1$.

S14: Since the node equipment B does not terminate the optical signal having the wavelength $\lambda 1$, the CPU 20 issues to the wavelength selective switch 13E an instruction to shut off the optical output of the wavelength $\lambda 1$.

S15: The wavelength selective switch 13E shuts off the optical output of the wavelength $\lambda 1$ according to the instruction issued from the CPU 20.

S16: The CPU 20 issues to the OSC controller 18E an instruction to set the $\lambda 1$ bit of the WCF signal to "1:failure".

S17: The OSC controller 18E sets the $\lambda 1$ bit of the WCF signal to "1" according to the instruction issued from the CPU 20. Then, the OSC controller 18E generates an OSC signal including the WCF signal.

S18: The OSC signal output from the OSC controller 18E is added to a WDM optical signal, and transmitted to the next node equipment (namely, the node equipment C).

Operations of the node equipments C, D and E are substantially the same as the operations (S11 to S18) of the node equipment B. Accordingly, each of the node equipments C, D and E shuts off the optical output of the wavelength $\lambda 1$.

S21: As a result of the shutoff performed in S15 in each of the node equipments B, C, D and E, the optical power of the wavelength $\lambda 1$ is sufficiently low in the node equipment F. Therefore, the OUPSR unit 31 detects the LOL state of the wavelength channel $\lambda 1$ (namely, the optical signal X1) on the WEST route.

Figure 22:
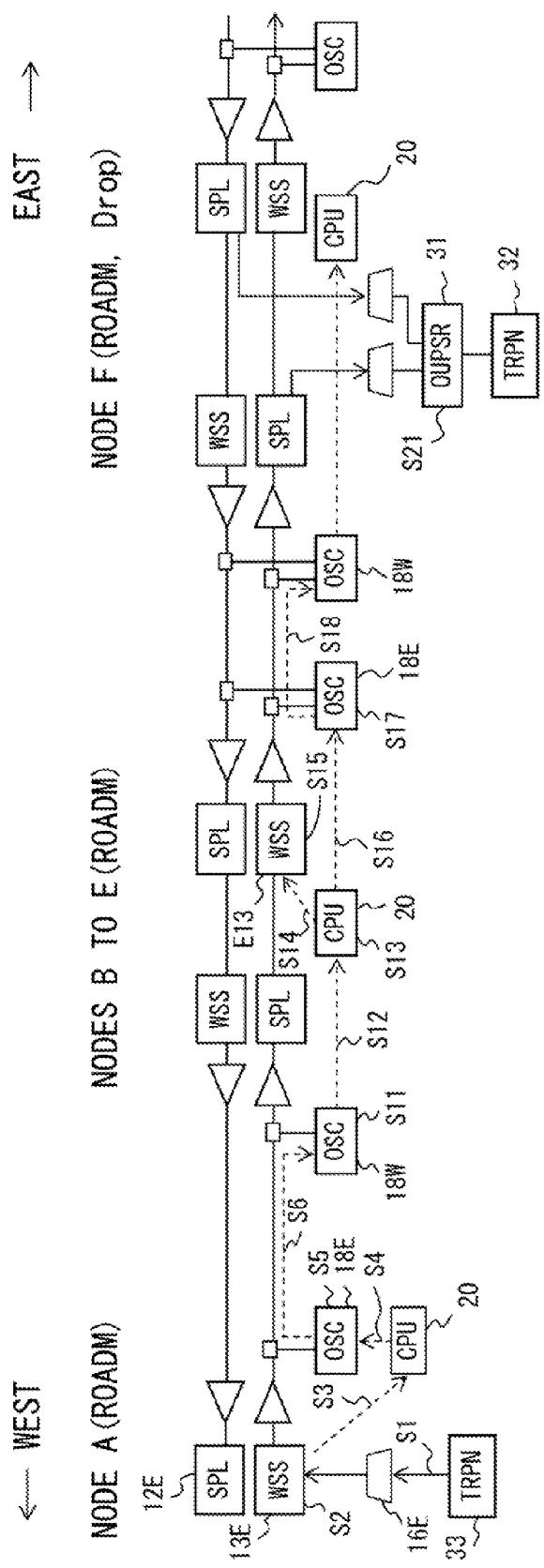
FIG. 22 is an explanatory view of shutoff cancellation operation according to the fifth embodiment.

FIG. 22 is an explanatory view of shutoff cancellation operation according to the fifth embodiment. Here, assume that the failure illustrated in FIG. 21 has been recovered.

A flow of a control signal of the shutoff cancellation operation is similar to that of the operation used when the shutoff described with reference to FIG. 21 is performed. With the shutoff cancellation operation, however, the WCF signal where the $\lambda 1$ bit is set to "0:OK" is transmitted from the node equipment A, and sequentially transferred to the node equipments B, C, D and E.

Each of the node equipments B, C, D and E cancels the shutoff of the wavelength $\lambda 1$ according to the received WCF signal in S11 to S15. Moreover, each of the node equipments B, C, D and E transmits to the next node equipment the WCF signal where the $\lambda 1$ bit is set to "0:OK" in S16 to S18. As a result, the optical signal X1 is transmitted up to the node equipment F.

Sixth Embodiment

A failure assumed in the sixth embodiment is the LOL state of a WDM optical signal. Such a failure is caused, for example, by a disconnection of an optical fiber that connects nodes.

Figure 23:
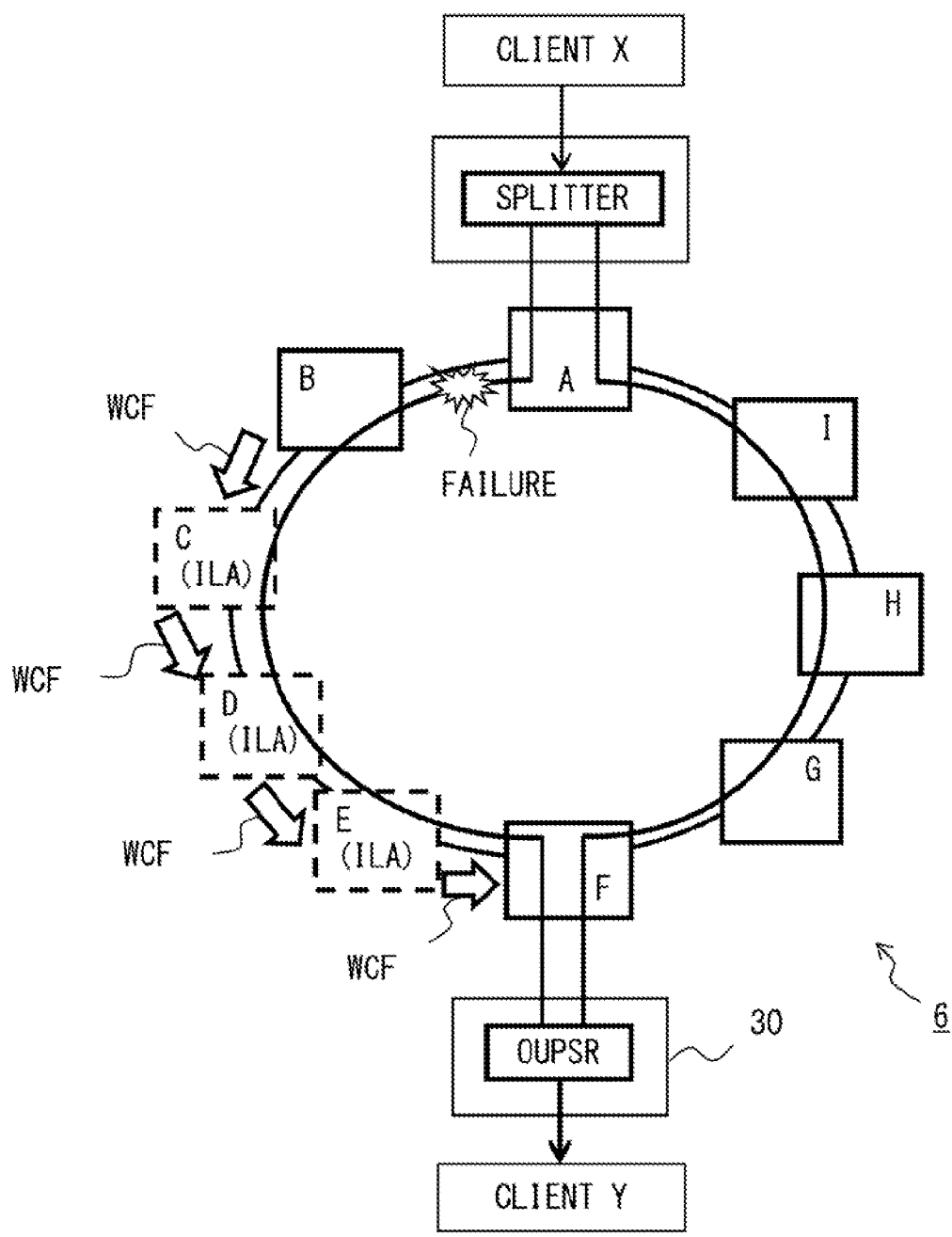
FIG. 23 is an explanatory view of an outline of a sixth embodiment.

FIG. 23 is an explanatory view of an outline of the sixth embodiment. Among node equipments A to I connected in the form of a ring in a WDM transmission system 6 according to the sixth embodiment illustrated in FIG. 23, the node equipments A, B and F are ROADMs, and the node equipments C, D and E are ILAs. The other node equipments are a ROADM or an ILA. Moreover, the WDM transmission system 6 according to the sixth embodiment does not use a shutoff signal.

Assume that an optical fiber for transmitting a WDM optical signal from the node equipments A toward the node equipment B (that is, in the counterclockwise direction) has been disconnected in the WDM transmission system 6. In this case, the node equipment B detects a failure (namely, LOL) of all wavelengths of the WDM optical signal. Then, the node equipment B generates a WCF signal indicating that all the wavelengths of the WDM optical signal are in the LOL state, and transmits the generated WCF signal to the node equipment C.

This WCF signal is sequentially relayed by the node equipments C, D and E, and transmitted up to the node equipment F. At this time, each of the node equipments C, D and E shuts off optical outputs of all the wavelengths of the WDM optical signal in response to reception of the WCF signal. However, the node equipments C, D and E do not shut off the OSC signal.

As described above, when only the ILAs (node equipments C, D and E) exist between the node equipment (node equipment B) that has detected the LOL state of the WDM optical signal and the drop node equipment (node equipment F), each of the ILAs shuts off the optical outputs of all the wavelengths of the WDM optical signal. Accordingly, ASE noise is sufficiently suppressed in all the wavelengths of the WDM optical signal in the node equipment F. As a result, the OUPSR unit determines that a wavelength channel dropped by the node equipment F is in the LOL state. When a ROADM exists between the node equipment that has detected the LOL state of the WDM optical signal and the drop node equipment, not an ILA but the ROADM may perform shutoff operation.

FIG. 24 is an explanatory view of shutoff operation according to the sixth embodiment. Here, assume that shutoff is performed due to the failure illustrated in FIG. 23.

S1: A WDM optical signal transmitted from the node equipment A does not reach the node equipment B. Such a failure is caused, for example, by a disconnection of an optical fiber that propagates a signal from the node equipment A to the node equipment B.

S2: In the node equipment B, the wavelength selective switch 13E detects that all the wavelengths of the input WDM optical signal are in the LOL state. Then, the wavelength selective switch 13E notifies the CPU 20 of this failure.

S3: The CPU 20 issues to the OSC controller 18E an instruction to set all the wavelength bits of the WCF signal to "1:failure".

S4: The OSC controller 18E respectively sets all the wavelength bits of the WCF signal to "1" according to the instruction issued from the CPU 20. In the example illustrated in FIG. 5, λ0 to λ87 bits are respectively set to "1". Then, the OSC controller 18E generates an OSC signal including the WCF signal.

S5: The OSC signal generated by the OSC controller 18E is added to an output WDM optical signal. Accordingly, this OSC signal is transmitted to the next node equipment (namely, the node equipment C).

S11: In the node equipment C, the OSC signal extracted from the input WDM optical signal is guided to the OSC controller 18W. Namely, the OSC controller 18W receives the OSC signal generated by the node equipment B.

S12: The OSC controller 18W extracts the WCF signal from the received OSC signal. Then, the OSC controller 18W transmits the extracted WCF signal to the CPU 20.

S13 to S14: The CPU 20 recognizes that all the wavelength bits of the WCF signal are "1". Moreover, the CPU 20 knows that the local node (namely, the node equipment C) is an ILA. In this case, the CPU 20 issues to the optical amplifier 14E an instruction to shut off optical outputs of all the wavelengths of the WDM optical signal.

S15: The optical amplifier 14E shuts off the optical outputs of all the wavelengths of the WDM optical signal according to the instruction issued from the CPU 20. Namely, the optical amplifier 14E reduces a gain for amplifying the WDM optical signal. Alternatively, when a variable optical attenuator is provided on an input side or an output side of the optical amplifier 14E, the node equipment C may shut off the WDM optical signal by controlling the variable optical attenuator.

S16: The CPU 20 issues to the OSC controller 18E an instruction to set all the wavelength bits of the WCF signal to "1:failure".

S17: The OSC controller 18E sets all the wavelength bits of the WCF signal to "1" according to the instruction issued from the CPU 20. Then, the OSC controller 18E generates an OSC signal including the WCF signal.

S18: The OSC signal generated by the OSC controller 18E is added to an output WDM optical signal. However, the WDM optical signal is shut off by the optical amplifier 14E. Accordingly, only the OSC signal is transmitted to the next node equipment (namely, the node equipment D).

Operations of the node equipments D and E are substantially the same as the operations (S11 to S18) of the node equipment C. Namely, each of the node equipments D and E shuts off the WDM optical signal. Then, each of the node equipments D and E transmits to the next node the WCF signal where all the wavelength bits are set to "1".

S21: As a result of the shutoff operation performed in S15, optical power of each of the wavelengths of the WDM optical signal is sufficiently low in the node equipment F. Accordingly, the OUPSR unit 31 detects the LOL state of the specified drop wavelength channel (for example, λ1, namely, the optical signal X1) on the WEST route.

FIG. 25 is an explanatory view of shutoff cancellation operation according to the sixth embodiment. Here, assume that the failure illustrated in FIG. 24 has been recovered.

A flow of a control signal of the shutoff cancellation operation is similar to that of the operation for performing shutoff, which are described with reference to FIG. 24. With the shutoff cancellation operation, however, the WCF signal where all the wavelength bits of the WDM optical signal are set to "0:OK" is transmitted from the node equipment B, and sequentially transferred to the node equipments C, D and E.

Each of the node equipments C, D and E cancels the shutoff of the WDM optical signal according to the received WCF signal in S11 to S15. Moreover, each of the node equipments C, D and E transmits to the next node equipment the WCF signal where all the wavelength bits of the WDM optical signal are set to "0" in S16 to S18. As a result, the specified drop optical signal (for example, X1) is transmitted up to the node equipment F.

Seventh Embodiment

In the first to the fifth embodiments, each of the node equipments controls the shutoff of an optical output based on the WCF signal/shutoff signal. At this time, the CPU 20 may issue to the wavelength selective switches 13E or 13W the instruction to perform or cancel the shutoff, for example, at each time of receiving the WCF signal/shutoff signal. With this method, however, the CPU 20 repeatedly issues the instruction to the wavelength selective switches 13E or 13W even when the WDM transmission system is normally operating. Namely, a load on the CPU 20 is heavy. Accordingly, the node equipment according to the seventh embodiment employs a configuration and operation, which reduce processes for a shutoff control of optical output.

FIGS. 26A and 26B are explanatory views of a shutoff control method according to the seventh embodiment. In the seventh embodiment, each of the node equipments has a state management table 41 as illustrated in FIG. 26A. As illustrated in FIG. 26B, the state management table 41 records, for each wavelength of a WDM optical signal, a state specified by the latest WCF signal, and a state represented by the latest shutoff signal. The state specified by the WCF signal is "1:failure" or "0:OK". The state represented by the shutoff signal is "1:perform shutoff" or "0:non-shutoff". FIG. 26B illustrates the state management table for either of a transmission line in the clockwise direction or a transmission line in the counterclockwise direction. Namely, each of the node equipments has the state management table 41 for each of the transmission line in the clockwise direction and the transmission line in the counterclockwise direction.

In FIG. 26A, each of the OSC controllers 18W and 18E extracts a WCF signal and a shutoff signal from an OSC signal upon receipt of the OSC signal from an adjacent node, and transmits the extracted WCF signal and shutoff signal to the CPU 20. The CPU 20 updates the state management table 41 with contents of the latest WCF signal and shutoff signal. Then, the CPU 20 determines, for each wavelength, whether or not the control condition, for example, illustrated in FIG. 6 is satisfied, and issues an instruction to the wavelength selective switches 13E or 13W for a wavelength the determination result of which has changed.

Each of the wavelength selective switches 13 and 13E has a shutoff control register 42. The shutoff control register 42 stores, for each wavelength of a WDM optical signal, information indicating whether or not to perform shutoff operation. Each of the wavelength selective switches 13W and 13E updates the shutoff control register 42 according to an instruction issued from the CPU 20, and controls the shutoff for each wavelength based on the information stored in the shutoff control register 42.

According to the seventh embodiment, the number of times that the CPU 20 issues the instructions related to shutoff to the wavelength selective switches 13W and 13E is significantly reduced. Note that the configuration of the seventh embodiment is applicable to the first to the sixth embodiments. However, when the seventh embodiment is applied to an embodiment that does not use the shutoff signal, the state management table 41 manages the state specified by the latest WCF signal for each wavelength. Moreover, when the seventh embodiment is applied to the sixth embodiment, the CPU 20 issues an instruction to the optical amplifier based on the state management table 41.

Eighth Embodiment

In some of the previous embodiments, when the optical signal within a WDM optical signal has entered the LOL state, node equipment immediately adjacent to a drop node of the failed optical signal shuts off a wavelength corresponding to the failed optical signal. In this case, each of the node equipments determines whether or not to perform shutoff by using a shutoff signal.

In contrast, in the eighth embodiment, each of node equipments (or some of the node equipments) holds topology information that represents a network topology, and routing information of a wavelength channel. Upon receipt of a failure signal, each or some of the node equipments determines whether or not to shut off a corresponding optical signal by using the topology information and the routing information.

Figure 27:
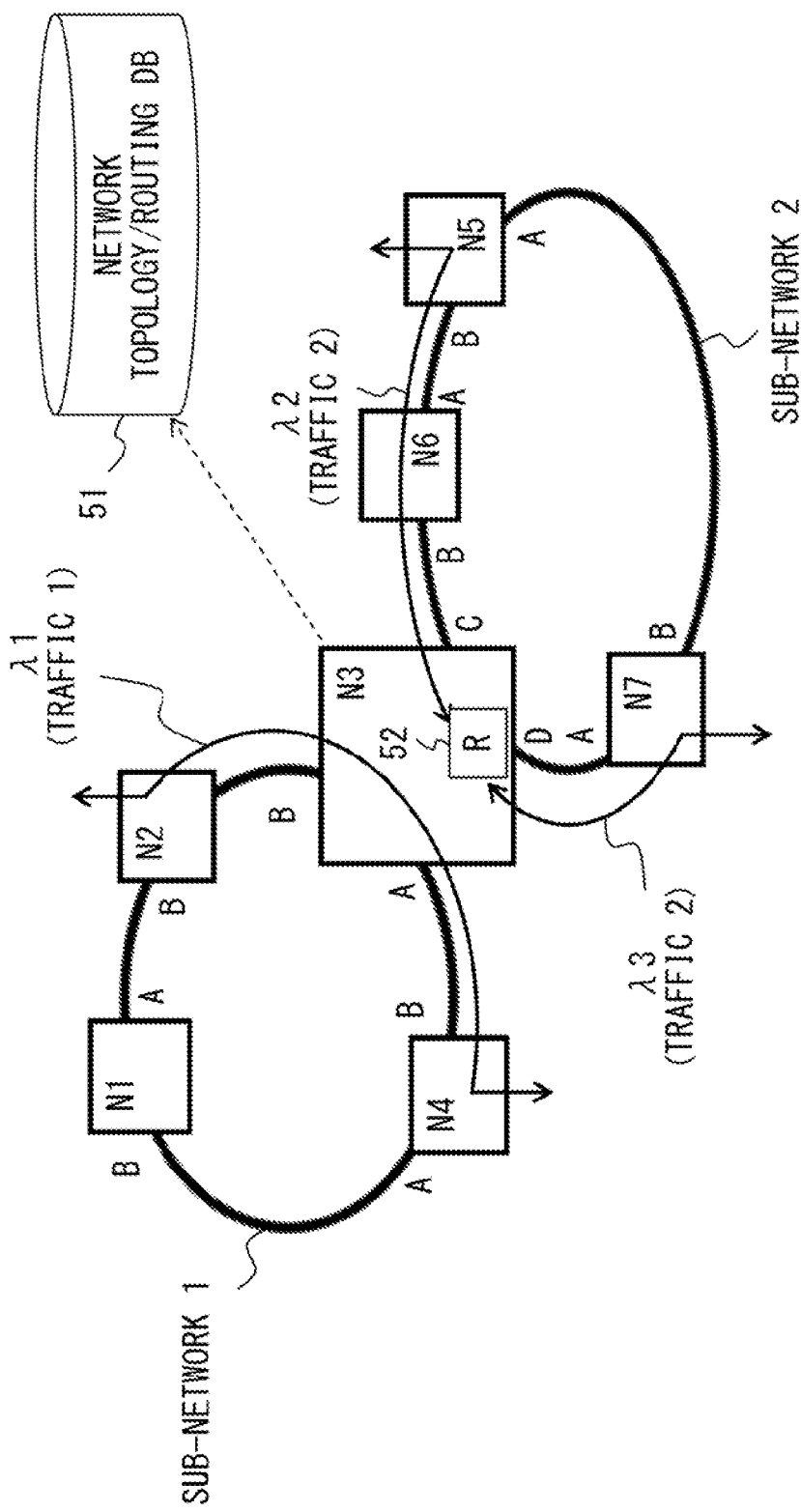
FIG. 27 illustrates one example of a WDM transmission system according to an eighth embodiment.

FIG. 27 illustrates one example of a WDM transmission system according to the eighth embodiment. In the example illustrated in FIG. 27, the WDM transmission system includes node equipments N1 to N7. Each of the node equipments N1 to N7 is a ROADM. This WDM transmission system also includes a sub-network 1 and a sub-network 2. The node equipments N1 to N4 belong to the sub-network 1, whereas the node equipments N3 and N5 to N7 belong to the sub-network 2. Namely, the node equipment N3 belongs to both of the sub-networks 1 and 2.

Each of the node equipments N1, N2 and N4 to N7 is a ROADM having a 2-degree configuration, and has two routes (degree-A and degree-B). The node equipment N3 is a ROADM having a 4-degree configuration, and has four routes (degree-A, degree-B, degree-C and degree-D).

Each of the node equipments N1 to N7 has a network topology/routing DB 51. The network topology/routing DB 51 stores the topology information that represents a network topology, and the routing information of a wavelength channel.

FIG. 28A illustrates one example of the topology information. This topology information represents a topology of the WDM transmission system illustrated in FIG. 27. The topology information identifies mutually adjacent nodes for each span. For example, a first record of the topology information about the sub-network 1 represents a configuration where degree-A of the node equipment N1 and degree-B of the node equipment N2 are connected. Note that an NID (Node Identifier) is an identifier for identifying each of the node equipments N1 to N7.

FIG. 28B illustrates one example of the routing information. This routing information represents traffics 1 and 2 illustrated in FIG. 27. The traffic 1 transmits data between the node equipments N2 and N4 via the node equipment N3. To the traffic 1, the wavelength λ1 is allocated. The traffic 2 transmits data between the node equipments N5 and N7 via the node equipments N3 and N6. Note that a wavelength is converted on a transmission route by the node equipment N3. Namely, a wavelength λ2 is allocated to the traffic 2 between the node equipments N5 and N3, whereas a wavelength λ3 is allocated to the traffic 2 between the node equipments N3 and N7. Namely, the node equipment N3 has a regenerative repeater 52 that can convert a wavelength of each optical signal within a WDM optical signal.

In FIG. 28B, by way of example, the routing information about the traffic 1 represents the followings.
Node equipment N4: degree-A is unused. The wavelength λ1 is allocated to degree-B.
Node equipment N3: The wavelength λ1 is allocated to degree-A and degree-B.
Node equipment N2: The wavelength λ1 is allocated to degree-A, and degree-B is unused.
"T" represents a terminated state (or a state where a route is unused). Moreover, the routing information is generated, for example, when a wavelength channel is set by the network management system.

Each of the node equipments has a wavelength path connection state management table. The wavelength path connection state management table is created based on the above described topology information and routing information. Moreover, the wavelength path connection state management table manages wavelength path connection information indicating whether or not a local node is arranged immediately adjacent to a drop node (or a destination node) on a wavelength path that passes through the local node as illustrated in FIG. 29.

FIG. 29 illustrates the wavelength path connection state management table implemented in the node equipment N3 in the network illustrated in FIG. 27. As illustrated in FIG. 29, the wavelength path connection information managed by the wavelength path connection state management table represents "connection" and "adjacent" for a combination of an ingress route and an input wavelength. "connection" represents an egress route and an output wavelength of an optical signal. For example, an optical signal having a wavelength λ1 input from the route degree-A to the node equipment N3 is output to the route degree-B. At this time, the wavelength of the output optical signal is λ1. Moreover, "adjacent" represents whether or not a local node is a node immediately adjacent to a drop node of an optical signal identified with "connection". For example, the optical signal having the wavelength λ1 output from the route degree-B of the node equipment N3 is dropped by the node equipment N2, as illustrated in FIG. 27. The node equipment N3 is arranged immediately adjacent to the node equipment N2. Accordingly, "adjacent=1" is set for this optical signal.

In the WDM transmission system having the above described configuration, when a optical signal having a certain wavelength is failed, a WCF signal that specifies the failed optical signal is generated in a similar manner as in the first to the fifth embodiments. Then, this WCF signal is transmitted from node equipment that has detected the failure to a drop node of the optical signal.

The node equipment that has received the WCF signal references the wavelength path connection state management table, and determines whether or not the local node is a node immediately preceding the drop node of the optical signal specified by the WCF signal. Then, the node equipment decides whether or not to shut off the optical signal according to a result of the determination.

Assume that the traffic 1 heading from the node equipment N4 to the node equipment N2 has entered the LOL state. Also assume that the node equipment N4 has detected this failure. In this case, the node equipment N4 transmits to the node equipment N3 a WCF signal that specifies λ1.

Upon receipt of the WCF signal that specifies λ1 from the route degree-A, the node equipment N3 obtains "connection: DegB-1" and "adjacent:1" from the wavelength path connection state management table illustrated in FIG. 29. In this case, the node equipment N3 determines that the node equipment N3 is located immediately adjacent to the drop node of the optical output of the wavelength λ1 output to the route degree-B. Accordingly, the node equipment N3 shuts off the optical output of the wavelength λ1 output to the route degree-B.

Alternatively, assume that the traffic 2 heading from the node equipment N7 to the node equipment N5 has entered the LOL state. Also assume that the node equipment N7 has detected this failure. In this case, the node equipment N7 transmits to the node equipment N3 a WCF signal that specifies λ3.

Upon receipt of the WCF signal that specifies λ3 from the route "degree-D", the node equipment N3 obtains "connection:DegC-2" and "adjacent:0" from the wavelength path connection state management table illustrated in FIG. 29. In this case, the node equipment N3 determines that the node equipment N3 is not a node immediately adjacent to the drop node of the optical output of the wavelength λ2 output to the route "degree-C". Accordingly, the node equipment N3 does not shut off the optical output of the wavelength λ2 output to the route "degree-C".

Note that the network topology/routing DB 51 may manage topology information and routing information for each route as illustrated in FIGS. 30 and 31. Also based on such topology information and routing information, a wavelength path connection state management table can be created similarly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A noise suppression method for use in an optical transmission system which includes a plurality of nodes transmitting a WDM optical signal, and in which first node equipment drops an optical signal transmitted via a first wavelength channel from the WDM optical signal and guides the dropped optical signal to a communication device, the noise suppression method comprising:
    transmitting a failure signal that represents whether or not a failure occurs for each of the plurality of wavelength channels in the WDM optical signal;
    transmitting a shutoff signal that represents whether or not a shutoff operation for shutting off an optical output is instructed for the respective wavelength channels; and
    shutting off the first wavelength channel when the failure signal represents that a failure occurs in the first wavelength channel and the shutoff signal represents that the shutoff operation is instructed for the first wavelength channel, wherein
    when second node equipment arranged on a first route for transmitting an optical signal with the first wavelength channel to the first node equipment detects a failure in the first wavelength channel, the second node equipment transmits the failure signal that represents a failure occurs in the first wavelength channel to the first node equipment via the first route,
    when the first node equipment receives the failure signal that represents a failure occurs in the first wavelength channel from the second node equipment, the first node equipment transmits the shutoff signal that represents the shutoff operation is instructed for the first wavelength channel toward the second node equipment via the first route,
    third node equipment shuts off an optical output of the first wavelength channel, after the third node equipment relays the failure signal that represents a failure occurs in the first wavelength channel, and when the third node equipment receives the shutoff signal that represents the shutoff operation is instructed for the first wavelength channel, and wherein
    the first node equipment periodically or constantly transmits the shutoff signal toward the second node equipment via the first route regardless of the failure signal.

2. The noise suppression method according to claim 1, wherein
    the first node equipment transmits the shutoff signal toward the second node equipment via the first route in response to reception of the failure signal.

3. The noise suppression method according to claim 1, wherein node equipment that firstly receives the shutoff signal from the first node equipment shuts off the optical output of the first wavelength channel.

4. The noise suppression method according to claim 1, wherein
    an amplifying node equipment for collectively amplifying a WDM optical signal is provided between the first node equipment and the second node equipment,
    the amplifying node equipment transfers the shutoff signal toward the second node equipment upon receipt of the shutoff signal, and
    the third node equipment shuts off the optical output of the first wavelength channel upon receipt of the shutoff signal that has transferred by the amplifying node equipment.

5. A noise suppression method for use in an optical transmission system which includes a plurality of nodes transmitting a WDM optical signal, and in which first node equipment drops an optical signal transmitted via a first wavelength channel from the WDM optical signal and guides the dropped optical signal to a communication device, the noise suppression method comprising:
    transmitting a failure signal that represents whether or not a failure occurs for each of the plurality of wavelength channels in the WDM optical signal;
    transmitting a shutoff signal that represents whether or not a shutoff operation for shutting off an optical output is instructed for the respective wavelength channels; and shutting off the first wavelength channel when the failure signal represents that a failure occurs in the first wavelength channel and the shutoff signal represents that the shutoff operation is instructed for the first wavelength channel, wherein when second node equipment arranged on a first route for transmitting an optical signal with the first wavelength channel to the first node equipment detects a failure in the first wavelength channel, the second node equipment transmits the failure signal that represents a failure occurs in the first wavelength channel to the first node equipment via the first route, when the first node equipment receives the failure signal that represents a failure occurs in the first wavelength channel from the second node equipment, the first node equipment transmits the shutoff signal that represents the shutoff operation is instructed for the first wavelength channel toward the second node equipment via the first route, third node equipment shuts off an optical output of the first wavelength channel, after the third node equipment relays the failure signal that represents a failure occurs in the first wavelength channel, and when the third node equipment receives the shutoff signal that represents the shutoff operation is instructed for the first wavelength channel, and wherein the third node equipment shuts off the optical output of the first wavelength channel by using a wavelength selecting device for passing or blocking an optical signal having a specified wavelength within the WDM optical signal, the third node equipment manages states of the failure signal and the shutoff signal, and issues to the wavelength selecting device an instruction to change an operating state only when the operating state of the wavelength selective device is altered due to a change in the state of the failure signal or the shutoff signal.

6. An optical transmission system which includes a plurality of nodes transmitting a WDM optical signal, and in which first node equipment drops an optical signal transmitted via a first wavelength channel from the WDM optical signal and guides the dropped first optical signal to a communication device, wherein a failure signal that represents whether or not a failure occurs for each of the plurality of wavelength channels in the WDM optical signal is transmitted, a shutoff signal that represents whether or not a shutoff operation for shutting off an optical output is instructed for the respective wavelength channels is transmitted, the first wavelength channel is shut off when the failure signal represents that a failure occurs in the first wavelength channel and the shutoff signal represents that the shutoff operation is instructed for the first wavelength channel, wherein when second node equipment arranged on a first route for transmitting an optical signal with the first wavelength channel to the first node equipment detects a failure in the first wavelength channel, the second node equipment transmits the failure signal that represents a failure occurs in the first wavelength channel to the first node equipment via the first route, when the first node equipment receives the failure signal that represents a failure occurs in the first wavelength channel from the second node equipment, the first node equipment transmits the shutoff signal that represents the shutoff operation is instructed for the first wavelength channel toward the second node equipment via the first route, third node equipment shuts off an optical output of the first wavelength channel, after the third node equipment relays the failure signal that represents a failure occurs in the first wavelength channel, and when the third node equipment receives the shutoff signal that represents the shutoff operation is instructed for the first wavelength channel, and wherein the first node equipment periodically or constantly transmits the shutoff signal toward the second node equipment via the first route regardless of the failure signal.

* * * * *